United States Patent
Zhang et al.

(10) Patent No.: US 12,299,773 B2
(45) Date of Patent: May 13, 2025

(54) METHOD AND APPARATUS FOR OBTAINING VIRTUAL IMAGE, COMPUTER DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventors: Pengfei Zhang, Shenzhen (CN); Chu Li, Shenzhen (CN); Yuan Jiang, Shenzhen (CN); Ziyu Yin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 197 days.

(21) Appl. No.: 17/986,364

(22) Filed: Nov. 14, 2022

(65) Prior Publication Data
US 2023/0072759 A1   Mar. 9, 2023

Related U.S. Application Data

(63) Continuation of application No. PCT/CN2022/080890, filed on Mar. 15, 2022.

(30) Foreign Application Priority Data

Apr. 13, 2021   (CN) .......................... 202110394129.5

(51) Int. Cl.
G06T 11/00        (2006.01)
(52) U.S. Cl.
CPC .................................. *G06T 11/00* (2013.01)

(58) Field of Classification Search
CPC ........... G06T 11/00; G06T 2207/20081; G06T 2207/20084; G06T 2207/30201;
(Continued)

(56) References Cited

U.S. PATENT DOCUMENTS 10,269,177 B2 *  4/2019  Frueh ...................... G06T 17/00
10,664,953 B1 *  5/2020  Lanman ................... G06N 3/08
(Continued)

FOREIGN PATENT DOCUMENTS

CN        108510437 A      9/2018
CN        110141857 A      8/2019
(Continued)

OTHER PUBLICATIONS

The World Intellectual Property Organization (WIPO) International Search Report for PCT/CN2022/080890 May 31, 2022 6 Pages (including translation).

(Continued)

*Primary Examiner* — Vijay Shankar
(74) *Attorney, Agent, or Firm* — ANOVA LAW GROUP, PLLC

(57) ABSTRACT

This application discloses a method and apparatus for obtaining a virtual image, a computer device, a computer-readable storage medium, and a computer program product, belonging to the technical field of artificial intelligence. The method includes obtaining a target image generation model by fusing a first image generation model and a second image generation model, the first image generation model being trained based on a sample original image, the sample original image retaining object ontology features of a sample object, and the second image generation model being trained based on a sample virtual image having target attributes; and obtaining a target virtual image corresponding to an original image of a target object based on the target image generation model (Continued)

model, the target virtual image retaining object ontology features of the target object and having the target attributes.

16 Claims, 8 Drawing Sheets

(58) Field of Classification Search
CPC ........ G06T 11/60; G06F 18/00; G06F 18/214; G06F 18/25; G06V 10/764; G06V 10/774; G06V 10/82; G06N 3/0464; G06N 3/0455; G06N 3/0475; G06N 3/09; G06N 3/094
See application file for complete search history.

(56) References Cited

U.S. PATENT DOCUMENTS

| | | | |
|---|---|---|---|
| 11,423,509 B2 | 8/2022 | Shen | |
| 11,652,959 B2* | 5/2023 | Oz | G06N 3/08 345/419 |
| 2018/0101989 A1* | 4/2018 | Frueh | G06T 19/20 |
| 2020/0202111 A1 | 6/2020 | Yuan et al. | |
| 2021/0232932 A1* | 7/2021 | Liu | G06V 10/774 |
| 2021/0358164 A1* | 11/2021 | Liu | G06N 3/088 |

FOREIGN PATENT DOCUMENTS

| | | |
|---|---|---|
| CN | 110728319 A | 1/2020 |
| CN | 111860167 A | 10/2020 |
| CN | 112017140 A | 12/2020 |
| CN | 112101320 A | 12/2020 |
| CN | 113705316 A | 11/2021 |
| WO | 2019118990 A1 | 6/2019 |
| WO | 2020173329 A1 | 9/2020 |

OTHER PUBLICATIONS

Jun-Yan Zhu et al., "Unpaired Image-to-Image Translation using Cycle-Consistent Adversarial Networks", 2017, p. 2223-2232, In Proceedings of the IEEE international conference on computer vision.
Junho Kim et al., "U-Gat-It: Unsupervised Generative Attentional Networks With Adaptive Layerinstance Normalization for Image-to-Image Translation" 2019, arXiv preprint arXiv:1907.10830.
Tero Karras et al., "Analyzing and Improving the Image Quality of StyleGAN", 2020, p. 8110-8119, In Proceedings of the IEEE/CVF Conference on Computer Vision and Pattern Recognition.
Kevin Dade , "Toonify: Cartoon Photo Effect Application".
The European Patent Office (EPO) The Extended European Search Report for 22787315.5 Jul. 8, 2024 7 Pages.

* cited by examiner (1) (2) (3)

(4) (5) (6)

METHOD AND APPARATUS FOR OBTAINING VIRTUAL IMAGE, COMPUTER DEVICE, COMPUTER-READABLE STORAGE MEDIUM, AND COMPUTER PROGRAM PRODUCT

RELATED APPLICATIONS

This application is a continuation of PCT Application No. PCT/CN2022/080890, filed on Mar. 15, 2022, which in turn claims priority to Chinese patent application No. 202110394129.5, filed on Apr. 13, 2021. The two applications are incorporated herein by reference in their entirety.

FIELD OF THE TECHNOLOGY

The embodiments of this application relate to the technical field of artificial intelligence, and particularly relate to a method and apparatus for obtaining a virtual image, a computer device, a computer-readable storage medium, and a computer program product.

BACKGROUND OF THE DISCLOSURE

With the development of the artificial intelligence technology, more and more application scenes need to obtain a virtual image corresponding to an original image of an object, where the virtual image corresponding to the original image of the object retains object ontology features of the object and has a certain attribute (anime style, cartoon style, etc.).

Often a sample image retaining object ontology features and having a specific attribute is obtained, and then, an image generation model is obtained by training based on the obtained sample image, thereby obtaining a virtual image corresponding to an original image of an object based on the obtained image generation model. Accordingly, it is necessary to use a large number of sample images meeting requirements. It is difficult to efficiently generate virtual images meeting quality requirements.

SUMMARY

The embodiments of this application provide a method and apparatus for obtaining a virtual image, a computer device, a computer-readable storage medium, and a computer program product, which may be used for improving the efficiency of obtaining the virtual image while ensuring the quality of the obtained virtual image. The technical solutions are as follows:

An embodiment of this application provides a method for obtaining a virtual image. The method includes obtaining a target image generation model by fusing a first image generation model and a second image generation model, the first image generation model being trained based on a sample original image, the sample original image retaining object ontology features of a sample object, and the second image generation model being trained based on a sample virtual image having target attributes; and obtaining a target virtual image corresponding to an original image of a target object based on the target image generation model, the target virtual image retaining object ontology features of the target object and having the target attributes.

An embodiment of this application provides a computer device, including a processor and a memory, the memory storing at least one computer program, the at least one computer program being loaded and executed by the processor to enable the computer device to implement the method for obtaining a virtual image according to any of the above.

An embodiment of this application further provides a non-transitory computer-readable storage medium, storing at least one computer program, the at least one computer program being loaded and executed by a processor to enable a computer to implement the method for obtaining a virtual image according to any of the above.

According to the embodiments of this application, by performing fusion processing on the first image generation model and the second image generation model, the target image generation model for obtaining the virtual image may be obtained. The first image generation model may focus on the object ontology features, and the second image generation model may focus on the target attributes. As a result, the target image generation model may focus on the object ontology features and the target attributes at the same time, thereby improving the quality of the obtained virtual image. Furthermore, compared with a sample image which retains object ontology features and has target attributes, it is easier to obtain the sample original image on which the first image generation model is obtained by training and the sample virtual image on which the second image generation model is obtained by training, thereby shortening the time needed to obtain the target image generation model, and improving the efficiency of obtaining the virtual image. In other words, the method for obtaining a virtual image provided by the embodiments of this application improves the efficiency of obtaining the virtual image while ensuring the quality of the obtained virtual image.

BRIEF DESCRIPTION OF THE DRAWINGS

To describe the technical solutions of the embodiments of this application more clearly, the following briefly introduces the accompanying drawings required for describing the embodiments. Apparently, the accompanying drawings in the following description show only some embodiments of this application, and a person of ordinary skill in the art may still derive other accompanying drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

It is to be noted that the specification and claims of this application, and terms "first" and "second" are used to distinguish similar objects, but are unnecessarily used to describe a specific sequence or order. It should be understood that data used in these embodiments is exchangeable in certain cases, so that the embodiments of this application described herein can be implemented in an order different from the order shown or described herein. The implementations described in the following embodiments do not represent all implementations that are consistent with this application. On the contrary, the implementations are merely examples of apparatuses and methods that are described in detail in the appended claims and that are consistent with some aspects of this application.

In some embodiments, the method for obtaining a virtual image provided by the embodiments of this application may be applied to the field of the artificial intelligence technology.

Many application scenes need to obtain a virtual image corresponding to an original image of an object, where the virtual image corresponding to the original image of the object retains object ontology features of the object and has a certain attribute (anime style, cartoon style, etc.). Often, a sample image retaining object ontology features and having a specific attribute is obtained, and then, an image generation model is obtained by training based on the obtained sample image, thereby obtaining a virtual image corresponding to an original image of an object based on the obtained image generation model. In embodiments of this application, in order to ensure that the obtained virtual image has better quality, it is necessary to obtain a large number of sample images retaining object ontology features and having specific attributes. In many cases, it is difficult to obtain sample images retaining object ontology features and having specific attributes, resulting in lower efficiency of obtaining image generation models by training, so that the efficiency of obtaining virtual images is low. If a smaller number of sample images are obtained in order to improve the efficiency of obtaining virtual images, the quality of virtual images generated by image generation models would be poor.

Figure 1:
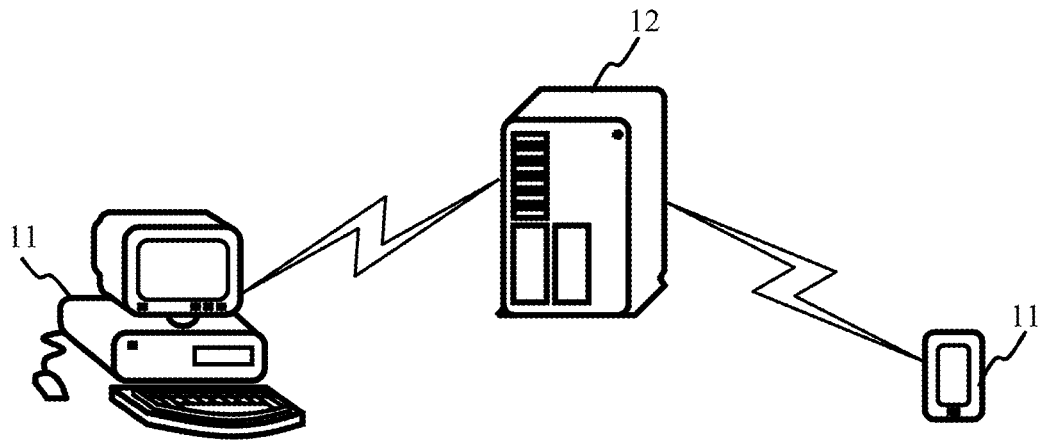
FIG. 1 is a schematic diagram of an implementation environment of a method for obtaining a virtual image provided by an embodiment of this application.

FIG. 1 shows a schematic diagram of an implementation environment of a method for obtaining a virtual image provided by an embodiment of this application. The implementation environment may include: a terminal 11 and a server 12.

The method for obtaining a virtual image provided by the embodiment of this application may be performed by the terminal 11, or performed by the server 12, or performed by the terminal 11 and the server 12 together, which is not limited in the embodiments of this application. When the method for obtaining a virtual image provided by the embodiment of this application is performed by the terminal 11 and the server 12 together, the server 12 undertakes the main computing work, and the terminal 11 undertakes the secondary computing work; or the server 12 undertakes the secondary computing work, and the terminal 11 undertakes the main computing work; or the server 12 and the terminal 11 use a distributed computing architecture for cooperative computing.

As an example, when the method is performed by the terminal 11 and the server 12 together, the method may be applied to an image editing client. The terminal 11 sends a virtual image generation request to the server 12, and the server 12 invokes model fusion to fuse a real model (that is, first image generation model) and a virtual style model (that is, second image generation model) to obtain a target image generation model with a function of generating an image retaining real textures and having a virtual style; the server 12 invokes the target image generation model to obtain a target virtual image corresponding to an original image of a target object, to improve the efficiency of obtaining the virtual image while ensuring the quality of the obtained virtual image; and the server 12 feeds the obtained target virtual image back to the terminal 11.

In some embodiments, the method for obtaining a virtual image provided by the embodiment of this application is implemented in a blockchain system. Images (sample original images, sample virtual images, original images of target objects, target virtual images, etc.) and models (target image generation models, first image generation models, second image generation models, etc.) involved in the method for obtaining a virtual image provided by the embodiment of this application are saved on blockchains in the blockchain system, so that the security and reliability of the images and models are higher.

The electronic device provided by the embodiment of this application for acquiring a virtual image may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smart phone, a tablet computer, a notebook computer, a desktop computer, a smart speaker, a smart watch, a voice playing device, a video playing device, a medical device, a vehicle, etc., but is not limited to this. An application supporting image processing is installed and runs on the terminal, for example, the application may be a system application, an image processing application, etc. The terminal and the server may be directly or indirectly connected in a wired or wireless communication manner. This is not limited in this application. A person skilled in the art is to understand that the terminal 11 and server 12 are only examples, and other existing or potential terminals or servers that are applicable to this application should also fall within the protection scope of this application, and are included herein by reference.

Taking a server as an example, it may be a server cluster deployed in the cloud to open AI as a Service (AiaaS) to users. The platform will split several types of common AI services, and provide independent or packaged services in the cloud. This service mode is similar to an AI-themed mall, where all users may access one or more AI services provided by the AIaaS platform through application programming interfaces.

For example, one of the AI cloud services may be a service for obtaining a virtual image, that is, a server in the cloud encapsulates an application for obtaining a virtual image provided by the embodiment of this application. The users invoke the service for obtaining a virtual image in the cloud service through the terminal (running a client, such as a map orientation client, a medical client, etc.), so that the server deployed in the cloud invokes the encapsulated application for obtaining a virtual image.

A person skilled in the art may learn that there may be more or fewer terminals and servers. For example, there may be only one terminal and server, or dozens or hundreds of terminals and servers, or more. The number and device type of terminals or servers are not limited in the embodiments of this application.

Figure 2:
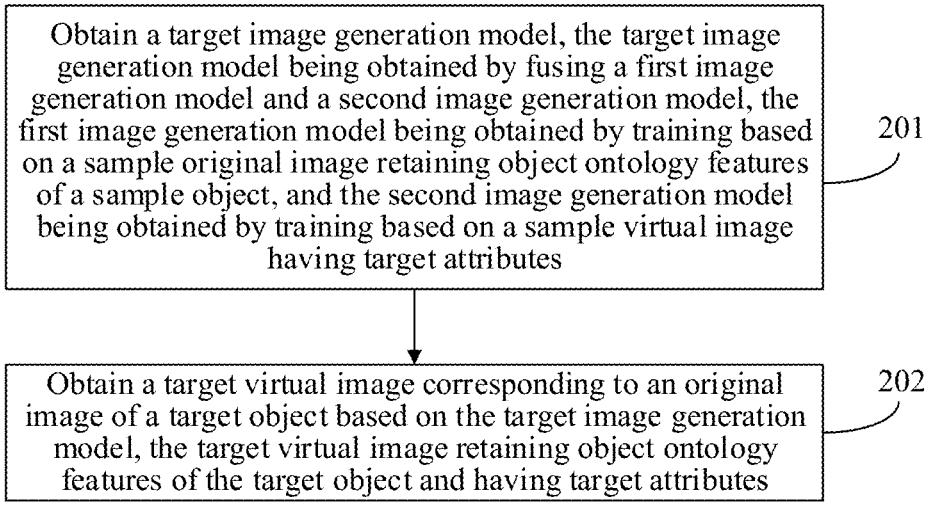
FIG. 2 is a flowchart of a method for obtaining a virtual image provided by an embodiment of this application.

Based on the implementation environment shown in FIG. 1, an embodiment of this application provides a method for obtaining a virtual image. Taking the method applied to a computer device as an example, the computer device may be a server or a terminal, which is not limited in the embodiments of this application. As shown in FIG. 2, the method for obtaining a virtual image provided by the embodiment of this application includes the following steps 201 and 202.

Step 201: Obtain a target image generation model.

As an example, the target image generation model is obtained by fusing a first image generation model and a second image generation model, the first image generation model is obtained by training based on a sample original image, the sample original image retains object ontology features of a sample object, and the second image generation model is obtained by training based on a sample virtual image having target attributes. The target image generation model is used for obtaining a virtual image retaining object ontology features and having target attributes.

In some embodiments, the target image generation model is obtained by fusing the first image generation model and the second image generation model, where the first image generation model is obtained by training based on the sample original image, the sample original image retains object ontology features of the sample object, and the second image generation model is obtained by training based on the sample virtual image having target attributes. Compared with a sample image which retains object ontology features and has target attributes in related technologies, it is easier to obtain the sample original image and the sample virtual image, and the obtaining time of the first image generation model and the obtaining time of the second image generation model are shorter, thereby shortening the time needed to obtain the target image generation model, to improve the efficiency of obtaining the virtual image.

Furthermore, the first image generation model obtained by training based on the sample original image retaining object ontology features of the sample object may focus on the object ontology features, and the second image generation model obtained by training based on the sample virtual image having target attributes may focus on the target attributes, therefore, the target image generation model obtained by fusing the first image generation model and the second image generation model may focus on the object ontology features and the target attributes at the same time, thereby improving the quality of the obtained virtual image.

The sample object refers to any entity object, and the type of the entity object is not limited in the embodiments of this application. In some embodiments, the type of the entity object is a human face, an animal face, an object, etc. The sample original image retains object ontology features of the sample object. The object ontology features of the sample object are used for uniquely identifying the sample object. In some embodiments, when the type of a sample object is a human face, according to the object ontology features of the sample object, the human face corresponding to the sample object may be known, and retaining the object ontology features may be achieved by retaining the facial form, textures, sub-parts, etc. of the human face. In some embodiments, the sample original image refers to a real image obtained after image collection is performed on the sample object. For example, when the type of a sample object is a human face, the sample original image refers to a real face image.

The target attribute refers to an attribute of an image, and the target attribute is set or adjusted according to application scenarios, which is not limited in the embodiments of this application. In some embodiments, the target attribute refers to a specific style (anime style, cartoon style, etc.); or the target attribute refers to a specific effect. The sample virtual image has target attributes. In some embodiments, the sample virtual image includes an object of which the type is the same as that of the sample object, to ensure the obtaining quality of the target image generation model. In the embodiments of this application, objects included in the sample virtual image are called virtual objects for easy distinction. It is to be noted that a virtual object included in the sample virtual image is an object obtained by virtualizing a real object, and the sample virtual image may retain the object ontology features of the real object corresponding to the virtual object, or may not retain the object ontology features of the real object corresponding to the virtual object, which is not limited in the embodiments of this application.

Obtaining the target image generation model in step 201 may refer to directly extracting a pre-stored target image generation model, or may refer to obtaining the target image generation model by fusing the first image generation model and the second image generation model, which is not limited in the embodiments of this application.

In some embodiments, the process of obtaining a target image generation model includes: obtain a sample original image and a sample virtual image; obtain a first image generation model by training based on the sample original image; obtain a second image generation model by training based on the sample virtual image; and perform fusion processing on the first image generation model and the second image generation model to obtain the target image generation model. The first image generation model obtained by training based on the sample original image retaining object ontology features of the sample object may focus on the object ontology features, and the second image generation model obtained by training based on the sample virtual image having target attributes may focus on the target attributes, therefore, the target image generation model obtained by fusing the first image generation model and the second image generation model may focus on the object ontology features and the target attributes at the same time, thereby improving the quality of the obtained virtual image.

Modes for obtaining the sample original image and the sample virtual image are not limited in the embodiments of this application. In some embodiments, the sample original image may be download from the Internet, or directly extracted from an original image library, or uploaded by the staff; and the sample virtual image may be download from the Internet, or extracted from a virtual image library, or uploaded by the staff. It is to be noted that the number of sample original images and the number of sample virtual images are not limited in the embodiments of this application, and may be flexibly set according to specific scenarios. In some embodiments, there are tens of thousands of sample original images; and there are dozens to hundreds of sample virtual images. It takes less time to obtain dozens to hundreds of sample virtual images having target attributes, thereby improving the efficiency of obtaining the second image generation model.

The first image generation model has a function of generating an image retaining object ontology features. Taking the type of a sample object as a human face as an example, the first image generation model has a function of generating a real face image retaining face identity information.

In some embodiments, the mode of obtaining the first image generation model by training based on the sample original image includes: obtain a first basic image generation model; and train the first basic image generation model based on the sample original image to obtain the first image generation model. The first basic image generation model may refer to an image generation model without any training, or may refer to a pre-trained image generation model, which is not limited in the embodiments of this application.

In some embodiments, the first image generation model is a generative adversarial model including a generation model and a discriminative model, and the first image generation model is obtained by training the first basic image generation model by a generative adversarial training mode based on the sample original image. The model structure of the first image generation model is not limited in the embodiments of this application. In some embodiments, the first image generation model is a style generative adversarial networks 2 (StyleGAN2) model, a progressive GAN model, etc.

In the process of training the first basic image generation model by a generative adversarial training mode based on the sample original image, the training target of the discriminative model in the first basic image generation model is to accurately determine whether an image is a false image generated by the image generation model or a real image in the sample original image, and the training target of the generation model in the first basic image generation model is to generate an image which is as close to the sample original image as possible, so that the discriminative model may not determine whether the generated image is a false image or a real image.

In some embodiments, in the process of training the first basic image generation model based on the sample original image, image enhancement is performed on the sample original image, and then, the first basic image generation model is trained based on the enhanced sample original image. In some embodiments, modes of performing image enhancement on the sample original image include but are not limited to rotating, noise adding, cropping, etc. In this mode, the image enhancement is applied online in the training process of the image generation model, which improves the quality of the image generated by the image generation model.

In some embodiments, there is one first image generation model. In the process of training the first basic image generation model based on the sample original image, the training effect is continuously monitored, and the image generation model obtained when the training effect reaches conditions is used as the first image generation model. In some embodiments, the mode of monitoring the training effect is to test the image generation effect of the image generation model obtained in the training process. The quality of the image generation effect of the image generation model may be determined by users or by a computer device according to judgment rules, which is not limited in the embodiments of this application. The judgment rules may be set by the users and uploaded to the computer device.

The second image generation model has a function of generating an image having target attributes. In some embodiments, taking the target attribute as a cartoon style as an example, the second image generation model may generate a cartoon style image. In some embodiments, the mode of obtaining the second image generation model by training based on the sample virtual image includes: obtain a second basic image generation model; and train the second basic image generation model based on the sample virtual image to obtain the second image generation model.

The second basic image generation model may refer to an image generation model without any training, or may refer to a pre-trained image generation model, or may refer to the first image generation model obtained by training based on the sample original image, which is not limited in the embodiments of this application. When the second basic image generation model refers to the first image generation model obtained by training based on the sample original image, the process of obtaining the second image generation model may be regarded as a process of finely adjusting the first image generation model by means of the sample virtual image.

In some embodiments, when the second basic image generation model refers to the first image generation model obtained by training based on the sample original image, the training of the second basic image generation model is stopped under the condition that the details of target attributes generated by the model are sufficient and a broken image may not be generated.

In some embodiments, the second image generation model is a generative adversarial model including a generation model and a discriminative model, and the second image generation model is obtained by training the second basic image generation model by a generative adversarial training mode based on the sample virtual image. The model structure of the second image generation model is not limited in the embodiments of this application. As an example, the model structure of the second image generation model is the same as the model structure of the first image generation model.

In the process of training the second basic image generation model by a generative adversarial training mode based on the sample virtual image, the training target of the discriminative model in the second basic image generation model is to accurately determine whether an image is a false image generated by the image generation model or a real image in the sample original image, and the training target of the generation model in the second basic image generation model is to generate an image which is as close to the sample virtual image as possible, so that the discriminative model may not determine whether the generated image is a false image or a real image.

In some embodiments, there may be one or more second image generation models, which is limited in the embodiments of this application. When there is one second image generation model, in the process of training the second basic image generation model based on the sample virtual image, the training effect is continuously monitored, and the image generation model obtained when the training effect reaches conditions is used as the second image generation model. When there are multiple second image generation models, different second image generation models are image generation models obtained within different training durations in the process of training the second basic image generation model based on the sample virtual image. The process of obtaining multiple second image generation models may be regarded as a process of controlling the learning ability of the finely-adjusted model by supervising the intermediate training result of the model.

In some embodiments, when the process of obtaining the second image generation model may be regarded as a process of finely adjusting the first image generation model by means of the sample virtual image and there are multiple second image generation models, the second image generation model obtained within a shorter training duration may generate an image which retains more object ontology features and has a weaker degree of target attributes; and the second image generation model obtained within a longer training duration may generate an image which retains less object ontology features and has a stronger degree of target attributes.

Figure 3:
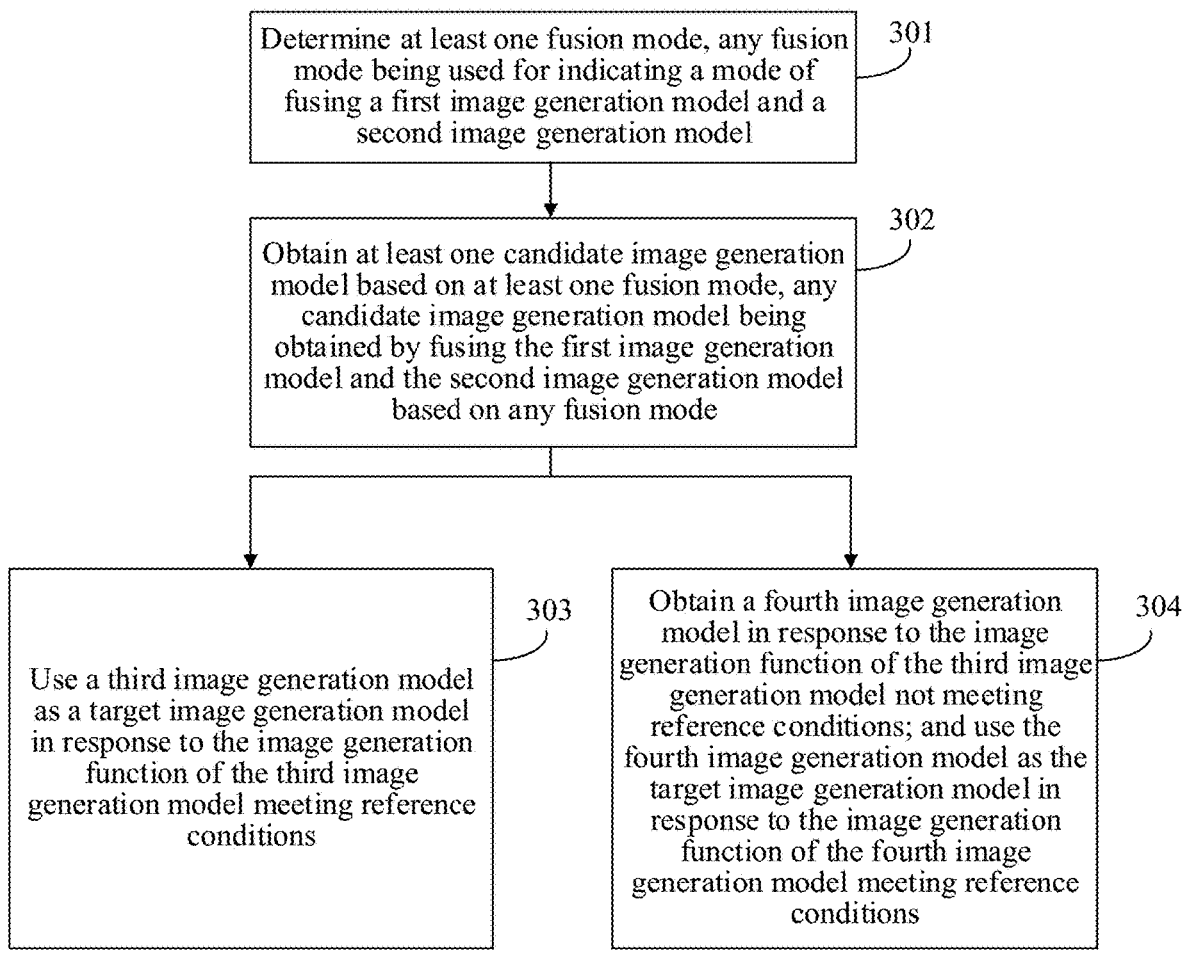
FIG. 3 is a flowchart of a process of fusing a first image generation model and a second image generation model to obtain a target image generation model provided by an embodiment of this application.

After the first image generation model and the second image generation model are obtained, the first image generation model and the second image generation model are fused to obtain the target image generation model, and the target image generation model has a function of generating an image retaining object ontology features and having target attributes. In some embodiments, referring to FIG. 3, the process of fusing a first image generation model and a second image generation model to obtain a target image generation model includes the following steps 301 to 304.

Step 301: Determine at least one fusion mode.

As an example, the fusion mode is used for indicating a mode of fusing the first image generation model and the second image generation model.

Because the fusion mode is used for indicating a mode of fusing the first image generation model and the second image generation model, according to the fusion mode, how to fuse the first image generation model and the second image generation model may be known.

In some embodiments, the process of determining at least one fusion mode includes: display the model parameters of the first image generation model and the model parameters of the second image generation model on a computer device for users to view, and obtain at least one fusion mode uploaded by the users through the computer device, where the uploaded at least one fusion mode is obtained by analyzing the parameters of the first image generation model and the parameters of the second image generation model.

In some embodiments, the at least one fusion mode is obtained by analyzing the parameters of the first image generation model and the parameters of the second image generation model by the computer device according to parameter analysis rules.

In some embodiments, both the first image generation model and the second image generation model include a network of reference number layers, that is, the first image generation model and the second image generation model have a same model structure. In this case, a candidate image generation model obtained based on the fusion mode also includes a network of reference number layers. The specific value of the reference number is not limited in the embodiments of this application, which may be determined according to the model structure of the image generation model, and may also be flexibly adjusted according to specific application scenes.

In some embodiments, the image generation model is a generative adversarial model, different layers of the network in the image generation model are different resolution layers, and the different resolution layers focus on features at different levels. In some embodiments, when the type of a sample object is a human face, low resolution layers in the image generation model focus on features such as the posture and facial form of the human face in a generated image; and high resolution layers in the image generation model focus on features such as light and texture in the generated image.

In some embodiments, when both the first image generation model and the second image generation model include a network of reference number layers, any fusion mode includes a determination mode of target network parameters corresponding to each layer of the network in the network of reference number layers. Determination modes of target network parameters corresponding to each layer of the network in the network of reference number layers included in different fusion modes are different. It is to be noted that the case that the determination modes of target network parameters corresponding to each layer of the network in the network of reference number layers included in two fusion modes are different may represent that the determination modes of target network parameters corresponding to a certain layer or certain layers of the network included in the two fusion modes are different.

The embodiment of this application takes one fusion mode as an example for description. The determination mode of the target network parameters corresponding to any layer of the network included in any fusion mode is used for indicating the relationship between the target network parameters corresponding to any layer of the network and at least one of first network parameters and second network parameters, where the first network parameters are parameters of any layer of the network in the first image generation model, and the second network parameters are parameters of any layer of the network in the second image generation model.

The relationship between the target network parameters corresponding to any layer of the network and at least one of the first network parameters and the second network parameters is used for specifying how the target network parameters corresponding to any layer of the network are determined according to at least one of the first network parameters and the second network parameters. In some embodiments, when there are multiple second image generation models, there are also multiple second network parameters, and each of the second image generation models corresponds to one second network parameter.

In some embodiments, the relationship between the target network parameters corresponding to any layer of the network and at least one of the first network parameters and the second network parameters may refer to the relationship between the target network parameters corresponding to any layer of the network and the first network parameters, or the relationship between the target network parameters corresponding to any layer of the network and one or more second network parameters, or the relationship between the target network parameters corresponding to any layer of the network and the first network parameters as well as one or more second network parameters, which is not limited in the embodiments of this application. The target network parameters corresponding to any layer of the network may be clearly determined according to the relationship between the target network parameters corresponding to any layer of the network and at least one of the first network parameters and the second network parameters.

It is to be noted that the determination modes of the target network parameters corresponding to different layers of the network included in the same fusion mode may be the same or different, which is not limited in the embodiments of this application. The determination modes of the target network parameters corresponding to the same layer of the network included in different fusion modes may be the same or different, which is also not limited in the embodiments of this application.

For example, assuming that there is one first image generation model, denoted as a model A; there are 5 second image generation models, denoted as a model B1, a model B2, a model B3, a model B4 and a model B5 respectively; and both the first image generation model and the second image generation model include a 18-layer network, that is, the reference number is 18. The determination mode of the target network parameters corresponding to the first layer of the network included in a fusion mode 1 is: the parameters of the first layer of the network in the model A are used as the target network parameters corresponding to the first layer of the network. The determination mode of the target network parameters corresponding to the seventh layer of the network included in the fusion mode 1 is: the parameters of the seventh layer of the network in the model A, the parameters of the seventh layer of the network in the model B1, the parameters of the seventh layer of the network in the model B2, the parameters of the seventh layer of the network in the model B3, the parameters of the seventh layer of the network in the model B4, and the parameters of the seventh layer of the network in the model B5 are weighted to compute a sum according to specified weights, and then, the obtained parameters are used as the target network parameters corresponding to the seventh layer of the network. The specified weights are given by the determination mode of the target network parameters corresponding to the seventh layer of the network included in the fusion mode 1. The determination mode of the target network parameters corresponding to the eighteenth layer of the network included in the fusion mode 1 is: the parameters of the eighteenth layer of the network in the model B5 are used as the target network parameters corresponding to the eighteenth layer of the network.

For example, on the basis of the above-mentioned example, the determination mode of the target network parameters corresponding to the first layer of the network included in a fusion mode 2 is: the parameters of the first layer of the network in the model A are used as the target network parameters corresponding to the first layer of the network. The determination mode of the target network parameters corresponding to the seventh layer of the network included in the fusion mode 2 is: the average parameters of the parameters of the seventh layer of the network in the model A and the parameters of the seventh layer of the network in the model B4 are used as the target parameters corresponding to the seventh layer of the network. The determination mode of the target network parameters corresponding to the eighteenth layer of the network included in the fusion mode 2 is: the parameters of the eighteenth layer of the network in the model B3 are used as the target network parameters corresponding to the eighteenth layer of the network.

In some embodiments, when there is one first image generation model and there are multiple second image generation models, the determination modes included in different fusion modes all involve the first image generation model and at least involve one second image generation model, and the second image generation models involved in different fusion modes may be the same or different. In some embodiments, the second image generation models involved in the determination mode included in the fusion mode 1 are the model B1, the model B2, the model B3, the model B4 and the model B5; and the second image generation models involved in the determination mode included in the fusion mode 2 are the model B3 and the model B4.

In some embodiments, when the second image generation models involved in the determination modes included in different fusion modes are the same, different fusion modes may be regarded as fusion modes corresponding to different parameter fusion schemes; and when the second image generation models involved in the determination modes included in different fusion modes are different, since the training durations corresponding to the second image generation models are different, different fusion modes may be regarded as fusion modes corresponding to different training durations.

It is to be noted that the determination modes of the target network parameters corresponding to some layers of the network in the above fusion modes are not limited in the embodiments of this application and may be flexibly set according to specific scenarios.

Step 302: Obtain at least one candidate image generation model based on at least one fusion mode, any candidate image generation model being obtained by fusing the first image generation model and the second image generation model based on any fusion mode.

Fusion processing is performed on the first image generation model and the second image generation model according to the fusion mode for each of the fusion modes, to obtain a candidate image generation model corresponding to the fusion mode.

After at least one fusion mode is determined, a candidate image generation model is obtained based on each fusion mode. The number of candidate image generation models is the same as the number of fusion modes. The embodiments of this application are described by obtaining any candidate image generation model based on any fusion mode as an example. Any candidate image generation model is obtained by fusing the first image generation model and the second image generation model based on any fusion mode.

In some embodiments, the process of obtaining any candidate image generation model based on any fusion mode includes: determine the target network parameters corresponding to each layer of the network in the network of reference number layers based on the determination mode of the target network parameters corresponding to each layer of the network in the network of reference number layers included in any fusion mode; and adjust the parameters of the network of reference number layers in a specified image generation model based on the target network parameters corresponding to each layer of the network in the network of reference number layers, and use the adjusted image generation model as any candidate image generation model. The richness of the candidate image generation model may be improved through different fusion modes and the determination mode of target network parameters included in each fusion mode.

Specifically, a determination mode corresponding to a fusion mode is obtained, where the determination mode indicates a determination mode of target network parameters of each layer of the network in the network of reference number layers; the target network parameters corresponding to each layer of the network are determined based on the determination mode; and the parameters of the network of reference number layers in a specified image generation model are adjusted based on the target network parameters corresponding to each layer of the network, and the adjusted image generation model is used as any candidate image generation model.

According to the introduction of the determination mode of the target network parameters corresponding to any layer of the network included in any fusion mode in step 301, it can be known that according to the determination mode of the target network parameters corresponding to any layer of the network included in any fusion mode, the target network parameters corresponding to any layer of the network may be determined. Therefore, based on the determination mode of the target network parameters corresponding to each layer of the network in the network of reference number layers included in any fusion mode, the target network parameters corresponding to each layer of the network in the network of reference number layers may be determined. It is to be noted that the target network parameters corresponding to each layer of the network in the network of reference number layers here are determined according to any fusion mode, and the target network parameters corresponding to each layer of the network in the network of reference number layers determined according to different fusion modes are different.

It is to be noted that the case that the target network parameters corresponding to each layer of the network in the network of reference number layers determined according to different fusion modes are different may represent that the target network parameters corresponding to a certain layer or certain layers of the network determined according to different fusion modes are different.

After the target network parameters corresponding to each layer of the network in the network of reference number layers are determined according to any fusion mode, the parameters of the network of reference number layers in a specified image generation model are adjusted based on the determined target network parameters corresponding to each layer of the network, and the adjusted image generation model is used as any candidate image generation model. The specified image generation model is an image generation model of which the parameters need to be adjusted corresponding to any fusion mode, and the specified image generation models of which the parameters need to be adjusted corresponding to different fusion modes may be the same or different, which is not limited in the embodiments of this application.

The determination mode of the specified image generation model is not limited in the embodiments of this application. In some embodiments, the specified image generation model is the first image generation model, or the specified image generation model is any second image generation model, or the specified image generation model is any model including the network of reference number layers. Regardless of the determination mode, the determined specified image generation model includes the network of reference number layers.

The purpose of adjusting the parameters of the network of reference number layers in the specified image generation model based on the target network parameters corresponding to each layer of the network in the network of reference number layers is the parameters of any layer of the network in the adjusted image generation model are the target network parameters corresponding to any layer of the network. In some embodiments, in the process of adjusting the parameters of the network of reference number layers in the specified image generation model based on the target network parameters corresponding to each layer of the network in the network of reference number layers, if the parameters of a certain layer of the network in the specified image generation model are the same as the target network parameters corresponding to this layer of the network, the parameters of this layer of the network in the specified image generation model are kept unchanged; and if the parameters of a certain layer of the network in the specified image generation model are different from the target network parameters corresponding to this layer of the network, the parameters of this layer of the network in the specified image generation model are replaced with the target network parameters corresponding to this layer of the network. After the parameters of the network of reference number layers in the specified image generation model are adjusted, the adjusted image generation model is used as any candidate image generation model.

The above content is described by obtaining any candidate image generation model based on any fusion mode as an example. According to the mode described above, based on each fusion mode, a candidate image generation model may be obtained, and then, at least one candidate image generation model may be obtained. In some embodiments, the process of obtaining at least one candidate image generation model may be regarded as a process of model fusion.

In some embodiments, after at least one candidate image generation model is obtained, a candidate image generation model meeting selection conditions is determined in the at least one candidate image generation model, and the candidate image generation model meeting the selection conditions is used as a third image generation model.

The candidate image generation model meeting the selection conditions is set or adjusted according to specific application scenarios, which is not limited in the embodiments of this application. In some embodiments, the candidate image generation model meeting the selection conditions is a candidate image generation model of which the image generation effect meets specified conditions in the at least one candidate image generation model. The image generation effect of the candidate image generation model may be determined by performing an image generation test on the candidate image generation model, and then analyzing the images generated by the image generation model. The image generation effect meeting the specified conditions means that the image generation effect is closest to the image generation effect required by a specific application scenario. Which image generation effect is closest to a specific application scenario is determined by users according to their experiences.

Figure 4:
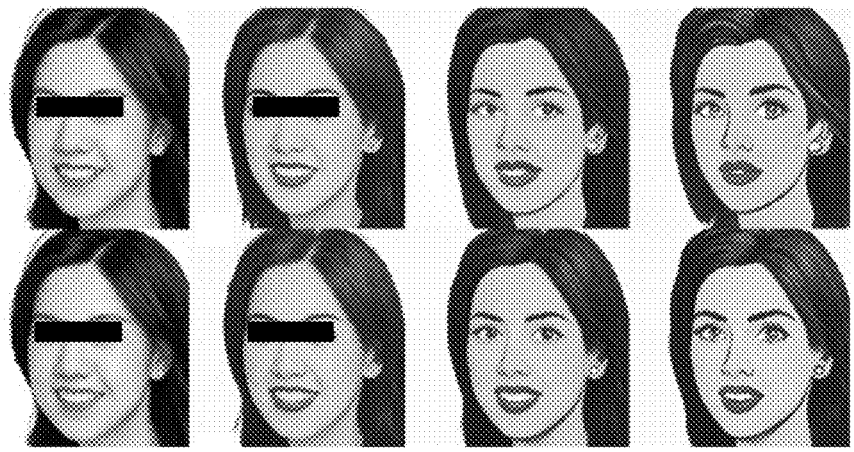
FIG. 4 is a schematic diagram of images generated by at least one image generation model after performing an image generation test on at least one candidate image generation model provided by an embodiment of this application.

In some embodiments, after an image generation test is performed on at least one candidate image generation model, images generated by the at least one image generation model are shown in FIG. 4. In FIG. 4, the first column shows original images of the real person, and the process of performing an image test on the at least one candidate image generation model is implemented by inputting image features of the original images of the real person into the at least one candidate image generation model respectively. In the images shown in FIG. 4, target attributes represent an American comic style. In addition to the original images of the real person, the images from left to right represent the images generated by the candidate image generation models determined according to fusion modes corresponding to different parameter fusion schemes, and the more to the right, the stronger the American comic style; and the images from top to bottom represent the images generated by the candidate image generation models determined according to the fusion modes corresponding to different training durations (from short to long), and the longer the training time, the stronger the American comic style. For the images generated by the other six candidate image generation models shown in FIG. 4 except for the real image, if the effect of an image is closest to the image generation effect required by an application scene, the candidate image generation model for generating the image is used as a candidate image generation model meeting selection conditions, that is, the candidate image generation model for generating the image is used as a third image generation model.

In some embodiments, the candidate image generation model with a better image generation effect is a model that selects appropriate parameters of the second image generation model in a specific high-resolution layer and selects appropriate parameters of the first image generation model in a specific low-resolution layer, so that the generated virtual image has more textures and details of target attributes and retains more object ontology features.

After the third image generation model is determined, whether the image generation function of the third image generation model meets the reference conditions is determined; if the image generation function of the third image generation model meets the reference conditions, step 303 is performed; and if the image generation function of the third image generation model does not meet the reference conditions, step 304 is performed. Whether the image generation function of an image generation model meets the reference conditions is set according to experiences or flexibly adjusted according to application scenes, which is not limited in the embodiments of this application. In some embodiments, if the image generation function of an image generation model meets a reference condition, it means that the image generation model may generate a desired virtual image.

In some embodiments, if the image generation function of an image generation model meets a reference condition, it means that the image generation model may generate a virtual image of a virtual object including specified postures. The specified postures are set or adjusted according to specific application scenarios. In some embodiments, when the type of a virtual object is a human face, the specified postures include but are not limited to frontal face, small-angle side face, large-angle side face, mouth opening, mouth closing, eye opening, eye closing, etc.

Step 303: Use the third image generation model as the target image generation model in response to the image generation function of the third image generation model meeting reference conditions.

When the image generation function of the third image generation model meets reference conditions, it means that there is no need to continue to obtain other image generation models, and the third image generation model is directly used as the target image generation model, where the third image generation model is a candidate image generation model meeting selection conditions in at least one candidate image generation model, and the efficiency of obtaining the target image generation model may be effectively improved.

Step 304: Obtain a fourth image generation model in response to the image generation function of the third image generation model not meeting reference conditions; and use the fourth image generation model as the target image generation model in response to the image generation function of the fourth image generation model meeting reference conditions.

When the image generation function of the third image generation model does not meet reference conditions, it means that the fourth image generation model needs to be further obtained to improve the image generation function of the image generation model. Compared with the third image generation model, the image generation function of the fourth image generation model is closer to reference conditions.

Figure 5:
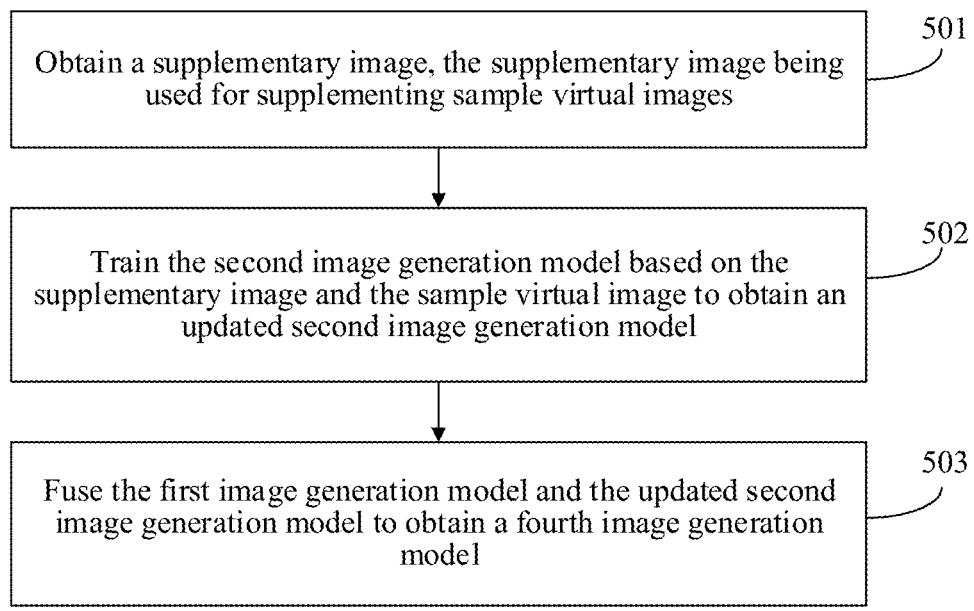
FIG. 5 is a flowchart of a process of obtaining a fourth image generation model provided by an embodiment of this application.

In some embodiments, referring to FIG. 5, the process of obtaining the fourth image generation model includes the following steps 501 to 503.

Step 501: Obtain a supplementary image, the supplementary image being used for supplementing sample virtual images.

In some embodiments, training an image generation model with a relatively stable effect usually requires tens of thousands of pieces of data. However, in research and development processes, it is often impossible to collect enough data, especially a better sample virtual image having target attributes may generally only have several hundred pieces of data, or even dozens of pieces of data. The data quality is not high, and the data coverage is still very low. For example, when the type of a virtual object is a human face, sample virtual images of which the postures of the virtual object are eye closing, mouth opening, large-angle side face, etc. are very scarce. But in specific scenes, these postures are common face postures. In other words, in the embodiments of this application, the reason why the image generation function of the third image generation model does not meet reference conditions is that the quality of the sample virtual image is not high or the coverage of the sample virtual image is low.

When the quality of the sample virtual image is not high or the coverage of the sample virtual image is low, although the third image generation model obtained by a mode of model fusion may generate images retaining object ontology features and having target attributes, the generation effect of images of postures not covered by the sample virtual image is poor. For example, when the type of a virtual object is a human face, the sample virtual image covers the posture of frontal face, but does not cover the postures of eye closing, large-angle side face, etc., the third image generation model has a good generation effect of images of virtual objects including the posture of frontal face, but has a poor generation effect of images of virtual objects including the postures of eye closing, large-angle side face, etc.

The supplementary image is used for supplementing sample virtual images, thereby enriching the initially collected sample virtual images. The supplementary image refers to an image having target attributes that is not covered by the sample virtual image. The process of obtaining the supplementary image may be regarded as a process of performing data enhancement of the sample virtual image. By means of the data enhancement, in the case of insufficient data, the missing sample data may be created, thereby greatly reducing the dependence on the sample virtual image. By means of the data enhancement, the number of sample virtual images having target attributes that need to be collected may be effectively reduced, thereby improving the efficiency of obtaining the second image generation model.

In some embodiments, the modes of obtaining the supplementary image include but are not limited to the following two modes:

Mode 1: Obtain enhanced image features, the enhanced image features being used for enhancing the image generation function of the second image generation model; and invoke the second image generation model to perform first image generation processing on the enhanced image features to obtain the supplementary image.

In the mode 1, the supplementary image is obtained by the enhanced image features, and the enhanced image features are used for enhancing the image generation function of the second image generation model. The supplementary image is obtained by the enhanced image features, and thus, the obtained supplementary image is used for enhancing the image generation function of the second image generation model.

The enhanced image features are determined according to the image generation function of the second image generation model that needs to be enhanced, which is not limited in the embodiments of this application. The image generation function of the second image generation model is used for indicating which virtual image the second image generation model may generate.

In some embodiments, the enhanced image features are determined by users, and the determined enhanced image features are uploaded to a computer device. The enhanced image features may be determined according to the existing image generation function by the second image generation model. In another implementation mode, the enhanced image features are obtained by analyzing the existing image generation function of the second image generation model by the computer device according to image generation function analysis rules.

In some embodiments, a mode of obtaining the enhanced image features includes: analyze the existing image generation function of the second image generation model to determine various types of images that the second image generation model may generate; compare the various types of images that the second image generation model may generate with required types of images, to determine which types of images the second image generation model may not generate; and use the image features for indicating the types of images that the second image generation model may not generate as the enhanced image features. In some embodiments, there may be one or multiple enhanced image features, which is not limited in the embodiments of this application. The required types are set according to experiences or flexibly adjusted according to specific application scenes.

In some embodiments, the image features for indicating the types of images that the second image generation model may not generate may be obtained by editing randomly generated image features, or by editing the image features of some real images, which is not limited in the embodiments of this application. In some embodiments, the image features may also be called latent vectors.

The process of obtaining the enhanced image features may be regarded as a process of gradually expanding the training data by means of image feature editing. In some embodiments, if an image feature is a feature of an image of a virtual object including the posture of eye opening, by editing the image feature in a direction of eye closing, an image feature for indicating an image of a virtual object including the posture of eye closing may be obtained, and then, the image of the virtual object including the posture of eye closing may be obtained by means of the image feature for indicating the image of the virtual object including the posture of eye closing.

In some embodiments, the process of editing the image feature is a process of editing the image feature by using a direction vector corresponding to a certain sub-feature that needs to be adjusted in the image feature. The sub-features that need to be adjusted in the image feature are determined according to specific situations, which is not limited in the embodiments of this application. In some embodiments, if a certain sub-feature that needs to be adjusted in the image feature is a face angle sub-feature, the image feature is edited by using a direction vector corresponding to the face angle sub-feature, so that the image feature of the image of the virtual object including the frontal face is edited to the image feature of the image of the virtual object including the side face.

In some embodiments, the direction vector corresponding to the sub-feature in the image feature is used for editing the sub-feature, and the direction vector corresponding to the sub-feature is set according to experiences or flexibly adjusted according to modes of obtaining the image feature, which is not limited in the embodiments of this application. In some embodiments, in the process of editing the image feature, the degree of editing may not be excessive, otherwise a generated image may be broken due to lack of corresponding data. In some embodiments, an enhanced image feature may be obtained by editing an image feature once, or may be obtained by editing an image feature continuously for many times. In a case of continuously editing an image feature many times to obtain an enhanced image feature, the image feature obtained by previous editing is edited every time until a final enhanced image feature is obtained.

For example, assuming that an enhanced image feature is a feature for indicating the image of the virtual object including the large-angle side face, the enhanced image feature is obtained by continuously editing the feature for indicating the image of the virtual object including the frontal face many times, and the face angle is edited at a smaller angle based on the result of the previous editing every time until a higher-quality enhanced image feature for indicating the image of the virtual object including the large-angle side face is generated.

After the enhanced image feature is obtained, the second image generation model is invoked to perform first image generation processing on the enhanced image feature to obtain the supplementary image. The second image generation model may generate an image according to the inputted image features. The enhanced image feature is inputted into the second image generation model, the second image generation model may perform first image generation processing on the enhanced image feature to output a generated image, and the image outputted by the second image generation model is used as the supplementary image.

In some embodiments, the process of invoking the second image generation model to perform first image generation processing on the enhanced image feature is an internal processing process of the second image generation model, and a specific processing mode is related to the model structure of the second image generation model, which is not limited in the embodiments of this application. In some embodiments, the second image generation model is a generative adversarial model, and the process of performing first image generation processing on the enhanced image feature by the second image generation model is a process of performing first image generation processing on the enhanced image feature by a generation model in the second image generation model.

Mode 2: Obtain an image driving model, the image driving model being obtained by training based on a sample video having target attributes; invoke the image driving model to process the sample virtual image to obtain an enhanced video corresponding to the sample virtual image; and extract video frames from the enhanced video corresponding to the sample virtual image as the supplementary image.

In the mode 2, the image driving model is used for obtaining the supplementary image for supplementing the sample virtual image. The image driving model has a function of driving an image of a virtual object having target attributes and including a certain posture into an enhanced video having target attributes. The enhanced video has video frames of virtual objects including multiple postures. The postures of the virtual objects included in different video frames may be the same or different. In some embodiments, in the enhanced video, the virtual objects included in different video frames have similar shapes, and video frames are extracted from the enhanced video as the supplementary image, so that the efficiency of obtaining the supplementary image may be effectively improved.

Obtaining the image driving model in the mode 2 may refer to extracting a pre-stored image driving model, or may refer to obtaining an image driving model obtained by training based on a sample video having target attributes, which is not limited in the embodiments of this application.

In some embodiments, the sample video having target attributes is obtained by users and uploaded to a computer device, or automatically download from the Internet by the computer device. In some embodiments, the sample video frames in the sample video having target attributes include a same virtual object, and the virtual object has various postures. In some embodiments, when the type of a virtual object is a human face, the postures of the virtual object include but are not limited to mouth opening, mouth closing, eye opening, eye closing, large-angle side face, small-angle side face, frontal face, etc.

In some embodiments, the process of obtaining the image driving model by training based on a sample video having target attributes includes: take any two sample video frames from the sample video, use one of the sample video frames as an original image, and use the other sample video frame as a target image; obtain the motion information of the posture of the virtual object in the target image relative to the posture of the virtual object in the original image; input the original image and the motion information into an initial driving model to obtain a predicted image outputted by the initial driving model; and obtain a driving loss function based on the difference between the target image and the predicted image, and train the initial driving model by means of the driving loss function to obtain the image driving model. The model structure of the initial driving model is not limited in the embodiments of this application. In some embodiments, the model structure of the initial driving model is a convolutional neural network model, such as a visual geometry group (VGG) model.

In some embodiments, the virtual object in the target image is similar to the virtual object in the original image in appearance, and the motion information of the posture of the virtual object in the target image relative to the posture of the virtual object in the original image is used for indicating the motion information required for adjusting the posture of the virtual object in the original image to the posture of the virtual object in the target image. In some embodiments, the motion information of the posture of the virtual object in the target image relative to the posture of the virtual object in the original image is obtained by decoupling the appearance information and posture information of the target image and the original image, and then comparing the posture information of the target image with the posture information of the original image.

The above-mentioned mode of obtaining the image driving model by training is a supervised training mode. The image driving model obtained by training by means of the above-mentioned mode may learn the posture of the virtual object in each sample video frame in the sample video, and may obtain a video composed of the video frames of the virtual object including the learned posture based on the image of the virtual object including a certain posture.

After the image driving model is obtained, the sample virtual image is inputted into the image driving model, and the image driving model drives the sample virtual image to obtain the enhanced video corresponding to the sample virtual image. The process of driving the sample virtual image by the image driving model is an internal processing process of the image driving model, and a specific processing mode is related to the model structure of the image driving model, which is not limited in the embodiments of this application.

The enhanced video corresponding to the sample virtual image is a video composed of the video frames of virtual objects including multiple postures, and the multiple postures are postures of the virtual objects in the sample video frames in the sample video. In some embodiments, when there are multiple sample virtual images, the image driving model may be invoked to drive all the sample virtual images respectively, or the image driving model may be invoked to drive some of the sample virtual images, which is not limited in the embodiments of this application. An enhanced video may be obtained by invoking the image driving model to drive each sample virtual image. The enhanced videos corresponding to different sample virtual images may be the same or different.

After the enhanced video corresponding to the sample virtual image is obtained, video frames are extracted from the enhanced video corresponding to the sample virtual image as the supplementary image. In some embodiments, which basic video frame or frames in the enhanced video corresponding to the sample virtual image are the video frames that need to be extracted is set according to needs. In some embodiments, the video frames that need to be extracted in the enhanced video corresponding to the sample virtual image refer to the video frames of the virtual objects including specified postures in each basic video frame in the enhanced video corresponding to the sample virtual image. In some embodiments, a specified posture refers to a posture that the virtual object in the sample virtual image lacks. For example, a posture of the virtual object in the sample virtual image is eye opening, and then, the specified posture is eye closing that the virtual object in the sample virtual image lacks.

In some embodiments, the process of obtaining the supplementary image by means of the mode 2 may be regarded as a process of performing data enhancement on the sample virtual image by means of an image driving technology. An image driving model is trained in advance by means of the image driving technology, and then, when the supplementary image needs to be obtained, the image driving model is invoked to process the sample virtual image to obtain the enhanced video, to extract video frames from the enhanced video as the supplementary image. When the type of a virtual object is a human face, the mode 2 may use the image driving model to create images of the virtual object including relatively lacking postures, such as side face, eye closing and mouth opening, thereby supplementing the images of the virtual object lacking in postures, such as large-angle side face and specific expressions, in originally collected sample virtual images.

Step 502: Train the second image generation model based on the supplementary image and the sample virtual image to obtain an updated second image generation model.

Since the supplementary image is used for supplementing the sample virtual image, after the supplementary image is obtained, the second image generation model is trained based on the supplementary image and the sample virtual image to obtain an updated second image generation model. The updated second image generation model has a better image generation function than the second image generation model before updating.

In some embodiments, a mode of training the second image generation model based on the supplementary image and the sample virtual image includes: mix the supplementary image and the sample virtual image together as a new sample virtual image; and train the second image generation model based on the new sample virtual image to obtain an updated second image generation model. In some embodiments, when there are multiple second image generation models, each second image generation model is trained respectively based on the new sample virtual image to obtain multiple updated second image generation models.

In some embodiments, the second image generation model is a generative adversarial model, and the updated second image generation model is obtained by training the second image generation model based on the new sample virtual image by a generative adversarial training mode.

Step 503: Fuse the first image generation model and the updated second image generation model to obtain a fourth image generation model.

After the updated second image generation model is obtained, the first image generation model and the updated second image generation model are fused to obtain the fourth image generation model. Compared with the third image generation model, since the second image generation model is updated, the fourth image generation model has a better image generation function.

In some embodiments, the process of fusing the first image generation model and the updated second image generation model to obtain a fourth image generation model includes: determine at least one second fusion mode, any second fusion mode being used for indicating a mode of fusing the first image generation model and the updated second image generation model; obtain at least one second candidate image generation model based on at least one second fusion mode, any second candidate image generation model being obtained by fusing the first image generation model and the updated second image generation model based on any second fusion mode; and use a second candidate image generation model meeting selection conditions in the at least one second candidate image generation model as the fourth image generation model. The implementation mode of the process refers to step 301 and step 302, which will not be repeated here.

It is to be noted that the mode of obtaining the fourth image generation model described in the above steps 501 to 503 is only one implementation mode, which is not limited in the embodiments of this application. In some embodiments, the process of obtaining a fourth image generation model includes: invoke the third image generation model to generate a second generated image; obtain second enhanced image features, the second enhanced image features being used for enhancing the image generation function of the third image generation model; invoke the third image generation model to process the second enhanced image features to obtain a third generated image; and train the third image generation model based on the second generated image and the third generated image to obtain the fourth image generation model.

The second generated image is an image that may be generated by the existing image generation function of the third image generation model, the third generated image is an image obtained by the second enhanced image features for enhancing the image generation function of the third image generation model, and the third generated image may supplement the second generated image. Therefore, the third image generation model is trained based on the second generated image and the third generated image to obtain the fourth image generation model of which the image generation function is better than that of the third image generation model.

After the fourth image generation model is obtained, whether the image generation function of the fourth image generation model meets reference conditions is determined. The mode of judging whether the image generation function of the fourth image generation model meets reference conditions refers to the mode of judging whether the image generation function of the third image generation model meets reference conditions, which will not be repeated here.

If the image generation function of the fourth image generation model meets reference conditions, the fourth image generation model is used as the target image generation model; and if the image generation function of the fourth image generation model does not meet reference conditions, a fifth image generation model is obtained until an image generation model of which the image generation function meets reference conditions is obtained, and the image generation model of which the image generation function meets reference conditions is used as the target image generation model. The process of obtaining the fifth image generation model refers to the process of obtaining the fourth image generation model, which will not be repeated here.

Figure 6:
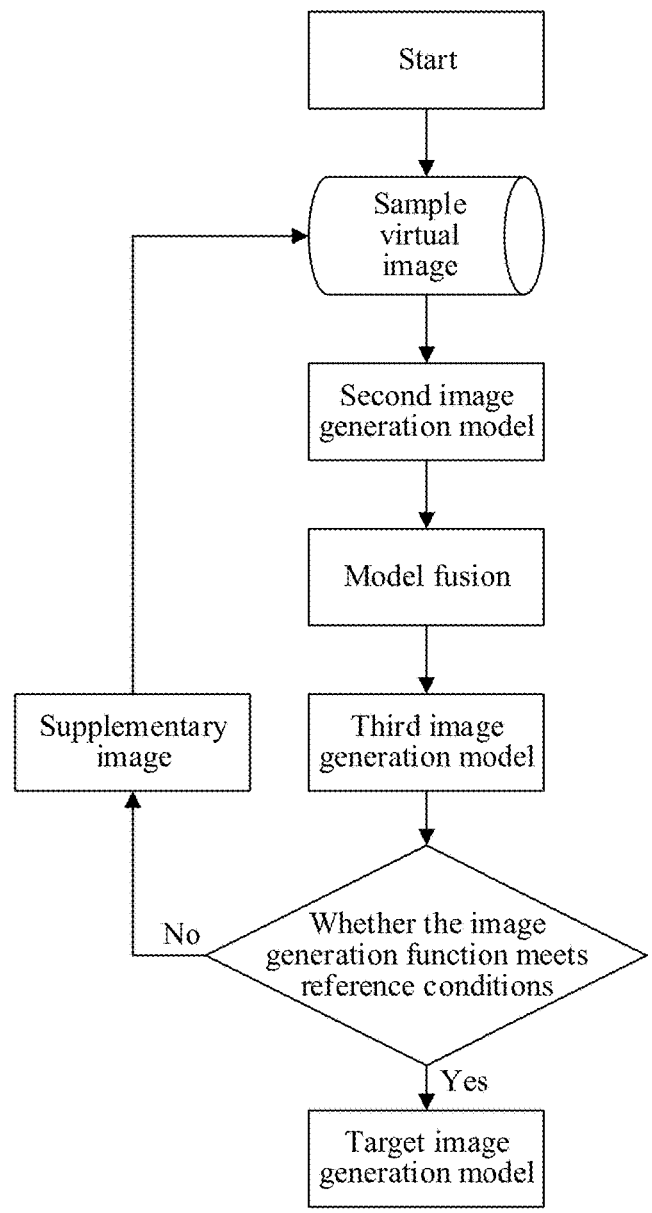
FIG. 6 is a schematic diagram of a process of obtaining a target image generation model provided by an embodiment of this application.

In some embodiments, the process of obtaining the target image generation model is shown in FIG. 6, including: first, collect sample virtual images, and then, obtain the second image generation model by the sample virtual images; fuse the first image generation model and the second image generation model to obtain the third image generation model; determine whether the image generation function of the third image generation model meets reference conditions; use the third image generation model as the target image generation model if the image generation function of the third image generation model meets reference conditions; and obtain the supplementary image if the image generation function of the third image generation model does not meet reference conditions, obtain the updated second image generation model by the supplementary image and the sample virtual image until the image generation model of which the image generation function meets reference conditions is obtained, and use the image generation model of which the image generation function meets reference conditions as the target image generation model.

Step 202: Obtain the target virtual image corresponding to the original image of the target object based on the target image generation model, the target virtual image retaining object ontology features of the target object and having target attributes.

After the target image generation model is obtained, based on the target image generation model, the target virtual image corresponding to the original image of the target object is obtained. Since the target image generation model may focus on object ontology features and target attributes at the same time, the target virtual image retains object ontology features of the target object and has target attributes.

The target object is an entity object of which the type is the same as that of the sample object, there may be one or more original images of the target object, and the source of the original image of the target object is diverse. In some embodiments, the original image of the target object is obtained from an original image library, or the original image of the target object is download from the Internet, or the original image of the target object is uploaded to a computer device by users, which is not limited in the embodiments of this application.

In some embodiments, modes of obtaining the target virtual image corresponding to the original image of the target object based on the target image generation model include but are not limited to the following two modes:

Mode 1: Obtain original image features corresponding to the original image of the target object; obtain target image features based on the original image features; and invoke the target image generation model to perform second image generation processing on the target image features to obtain the target virtual image corresponding to the original image of the target object.

The original image features corresponding to the original image of the target object are obtained by performing feature extraction on the original image of the target object. The mode of performing feature extraction on the original image of the target object is not limited in the embodiments of this application, for example, a feature extraction model is invoked to perform feature extraction on the original image of the target object. After the original image features are obtained, based on the original image features, target image features for being inputted into the target image generation model are obtained, the second image generation processing is performed on the target image features by the target image generation model, and the virtual image generated by the target image generation model according to the inputted target image features is used as the target virtual image corresponding to the original image of the target object. The process of performing second image generation processing on the target image features by the target image generation model is an internal processing process of the target image generation model, and a specific processing mode is related to the model structure of target image generation model, which is not limited in the embodiments of this application.

The target image features are image features which are obtained based on the original image features and need to be inputted into the target image generation model. In some embodiments, the mode of obtaining the target image features based on the original image features includes: directly use the original image features as the target image features. In this mode, the target image generation model is directly invoked to process the original image features to obtain the target virtual image, so that the efficiency of obtaining the target virtual image is higher.

In some embodiments, the mode of obtaining the target image features based on the original image features includes: convert the original image features by means of an image feature conversion mode corresponding to the target image generation model, to obtain converted image features; and use the converted image features as the target image features.

The image feature conversion mode corresponding to the target image generation model is used for indicating a mode of converting the original image features. In some embodiments, the image feature conversion mode is set according to experiences or flexibly adjusted according to the image generation effect of the target image generation model. The purpose of setting the image feature conversion mode is to: enable the virtual image generated by the target image generation model to have object ontology features and target attributes at the same time. In some embodiments, when the type of an object is a human face, the purpose of setting the image feature conversion mode is to: enable the virtual image generated by the target image generation model to maintain the similarity of the facial form, facial features, etc. of the real person, and have more details of the target attributes. In some embodiments, if the image generation effect of the target image generation model is an effect of weaker target attributes, the image feature conversion mode is used for indicating the conversion of the original image features to the direction of enhanced target attributes. According to the image features converted by the image feature conversion mode, it is beneficial to improve the quality of the generated virtual image.

When the target image generation model has a corresponding image feature conversion mode, after the original image features corresponding to the original image of the target object are obtained, the original image features are converted by means of the image feature conversion mode to obtain converted image features. Then, the converted image features are inputted into the target image generation model, the converted image features are processed by the target image generation model, and the virtual image generated by the target image generation model according to the inputted converted image features is used as the target virtual image corresponding to the original image of the target object. Compared with the target virtual image obtained by directly invoking the target image generation model to process the original image features, the quality of the target virtual image obtained by invoking the target image generation model to process the converted image features is better.

Mode 2: Invoke the target image generation model to perform third image generation processing on candidate image features to obtain a candidate virtual image corresponding to the candidate image features; obtain a target image translation model based on the candidate original image corresponding to the candidate image features and the candidate virtual image corresponding to the candidate image features, the candidate original image corresponding to the candidate image features being an image identified by the candidate image features and retaining object ontology features; and invoke the target image translation model to perform target image translation processing on the original image of the target object to obtain the target virtual image corresponding to the original image of the target object.

In the mode 2, first, the target image translation model is obtained based on the target image generation model, and then, the target image translation model is invoked to obtain the target virtual image. The target image translation model has a function of outputting the virtual image which retains the same object ontology features and has target attributes according to the inputted original image retaining object ontology features. In this mode, target image translation processing is performed on the original image by the target image translation model to obtain the target virtual image, the accuracy of obtaining the target virtual image is higher, and the target image translation model is obtained by training based on the candidate original image corresponding to the candidate image features and the candidate virtual image corresponding to the candidate image features. In some embodiments, the candidate image features are randomly generated image features, or image features obtained after feature extraction is performed on an image retaining object ontology features, which is not limited in the embodiments of this application.

It is to be noted that there may be one or more candidate image features, and each candidate image feature identifies an image retaining object ontology features. In the embodiments of this application, the image identified by candidate image features and retaining object ontology features is called a candidate original image corresponding to the candidate image features. When the candidate image features are randomly generated image features, the candidate original image corresponding to the candidate image features is a false image; and when the candidate image features are image features obtained after feature extraction is performed on an image retaining object ontology features, the candidate original image corresponding to the candidate image features is a real image. The image features are in one-to-one correspondence to images, and thus, candidate original images corresponding to the candidate image features may be obtained by performing image restoration on the candidate image features.

The candidate virtual image corresponding to the candidate image features is obtained by invoking the target image generation model, the candidate image features are inputted into the target image generation model, and third image generation processing is performed on the candidate image features by the target image generation model to obtain the candidate virtual image corresponding to the candidate image features. The candidate virtual image corresponding to the candidate image features retains the object ontology features retained by the candidate original image identified by the candidate image features, and has target attributes. The process of performing third image generation processing on the candidate image features by the target image generation model is an internal processing process of the target image generation model, and a specific processing mode is related to the model structure of the target image generation model, which is not limited in the embodiments of this application.

The candidate original image corresponding to the candidate image features and the candidate virtual image corresponding to the candidate image features are the training data required for obtaining the target image translation model. After the candidate original image corresponding to the candidate image features and the candidate virtual image corresponding to the candidate image features are obtained, the target image translation model may be obtained by a training mode. In some embodiments, the process of obtaining the target image translation model based on the candidate original image corresponding to the candidate image features and the candidate virtual image corresponding to the candidate image features includes: invoke an initial image translation model to perform initial image translation processing on the candidate original image corresponding to the candidate image features to obtain a candidate predicted image corresponding to the candidate image features; determine a loss function based on the difference between the candidate predicted image corresponding to the candidate image features and the candidate virtual image corresponding to the candidate image features; and train the initial image translation model by means of the loss function to obtain the target image translation model.

The initial image translation model refers to an image translation model to be trained, and the model structure of the initial image translation model is not limited in the embodiments of this application. In some embodiments, the model structure of the initial image translation model is an encoding-decoding structure. The above-mentioned process of obtaining the target image translation model by training based on the candidate original image corresponding to the candidate image features and the candidate virtual image corresponding to the candidate image features is a supervised training process, which will not be repeated here.

The target image translation model is obtained by training based on the candidate original image corresponding to the candidate image features and the candidate virtual image corresponding to the candidate image features by a supervised training mode, where the candidate virtual image is obtained by invoking the target image generation model, and the candidate virtual image may retain object ontology features and has target attributes, so that the target image translation model has a function of outputting the virtual image which retains object ontology features and has target attributes according to the inputted original image.

After the target image translation model is obtained, the original image of the target object is inputted into the target image translation model, and target image translation processing is performed on the original image of the target object by the target image translation model to obtain the target virtual image corresponding to the original image of the target object. The process of performing target image translation processing on the original image of the target object by the target image translation model is an internal processing process of the target image translation model, and a specific processing mode is related to the model structure of the target image translation model, which is not limited in the embodiments of this application.

In some embodiments, the purpose of obtaining the target virtual image corresponding to the original image of the target object is to use the original image-target virtual image data pairs of the target object as the training data of an image prediction model corresponding to the target attributes. In this case, when there are only tens to hundreds of sample virtual images, by means of the method provided by the embodiments of this application, tens of thousands of virtual images corresponding to high-quality original images may be obtained, tens of thousands of original image-virtual image data pairs may be obtained, and then, the image prediction model corresponding to the target attributes is trained by means of the obtained original image-virtual image data pairs. In some embodiments, the image prediction model corresponding to the target attributes is a model required by products, and the purpose of training the image prediction model by means of the obtained original image-virtual image data pairs is to enable the image prediction model to meet product launch standards.

In some embodiments, when the purpose of obtaining the target virtual image corresponding to the original image of the target object is to use the original image-target virtual image data pairs of the target object as the training data of the image prediction model corresponding to the target attributes, after the target virtual image corresponding to the original image of the target object is obtained based on the target image generation model, the method further includes: input the original image of the target object into an initial image prediction model to obtain a predicted image corresponding to the original image of the target object predicted by the initial image prediction model; determine a loss function based on the difference between the predicted image and the target virtual image; and train the initial image prediction model by means of the loss function to obtain the target image prediction model. In other words, the target image prediction model is obtained by training based on the original image of the target object and the target virtual image corresponding to the original image of the target object.

The model structure of the initial image prediction model is not limited in the embodiments of this application. In some embodiments, the model structure of the initial image prediction model is an encoding-decoding structure. The process of obtaining the target image prediction model by training based on the original image and the target virtual image of the target object is a supervised training process, which will not be repeated here.

In some embodiments, the model structures of the target image prediction model and the target image translation model may be the same or different. In some embodiments, when the model structures of the target image prediction model and the target image translation model are the same, the number of model parameters of the target image prediction model is smaller than the number of model parameters of the target image translation model, to save the resources of deployment devices of products.

In some embodiments, after the target image prediction model is obtained, the target image prediction model may be applied to products, so that the gameplay of displaying a virtual image retaining object ontology features and having target attributes may be launched. In some embodiments, a launch process of gameplay of displaying a virtual image retaining object ontology features and having target attributes is shown in FIG. 7, including: collect data, including but not limited to a sample original image retaining object ontology features of a sample object and a sample virtual image having target attributes; obtain a first image generation model and a second image generation model by training by means of the collected data, and perform model fusion and data enhancement on the first image generation model and the second image generation model to obtain a target image generation model; obtain training data required for obtaining a target image prediction model by training based on the target image generation model, and perform on-terminal model training by means of the obtained training data to obtain the target image prediction model; and apply the target image prediction model to products after obtaining the target image prediction model, to enable the gameplay of displaying a virtual image retaining object ontology features and having target attributes to be launched.

Figure 7:
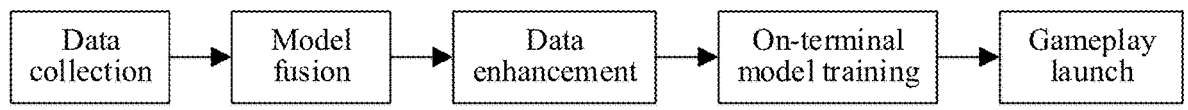
FIG. 7 is a schematic diagram of a launch process of gameplay of displaying a virtual image retaining object ontology features and having target attributes provided by an embodiment of this application.

In the process shown in FIG. 7, the model fusion and the data enhancement play a role in linking the previous and the next and are responsible for learning the target attributes in the collected tens to hundreds of sample virtual images, and the target attributes are migrated to tens of thousands of original images, to provide high-quality training data for on-terminal model training to enable the gameplay to be launched.

In some embodiments, after the gameplay of displaying a virtual image retaining object ontology features and having target attributes is launched, the process further includes: collect an original image of an interactive object in response to a virtual image display instruction for the target attributes; invoke the target image prediction model to perform image prediction processing on the original image of the interactive object to obtain a virtual image corresponding to the original image of the interactive object; and display the virtual image corresponding to the original image of the interactive object. The target image prediction model is obtained by training based on the original image of the target object and the target virtual image corresponding to the original image of the target object. According to the embodiments of this application, the human-computer interaction diversity may be improved, thereby improving the human-computer interaction efficiency of the interactive object.

A virtual image display instruction for target attributes is used for triggering an operation of collecting the original image of the interactive object, and the mode of obtaining the virtual image display instruction for target attributes is not limited in the embodiments of this application. In some embodiments, multiple optional attributes are displayed in a display interface. In response to detecting a trigger operation on target attributes, the virtual image display instruction for target attributes is obtained. After the virtual image display instruction for target attributes is obtained, the original image of the interactive object is collected. In some embodiments, the interactive object refers to the face of a user generating the virtual image display instruction for target attributes.

Since the target image prediction model is obtained by training based on original image-virtual image (retaining object ontology features and having target attributes) data pairs, the original image of the interactive object is inputted into the target image prediction model, the target image prediction model performs image prediction processing on the original image of the interactive object to obtain the virtual image corresponding to the original image of the interactive object, and the virtual image corresponding to the original image of the interactive object retains object ontology features of the interactive object and has target attributes. The process of processing the original image of the interactive object by the target image prediction model is an internal processing process of the target image prediction model, and a specific image prediction processing mode is related to the model structure of the target image prediction model, which is not limited in the embodiments of this application. After the virtual image corresponding to the original image of the interactive object is obtained, the virtual image corresponding to the original image of the interactive object is displayed in the display interface.

In some embodiments, after the virtual image corresponding to the original image of the interactive object is displayed, new original images of the interactive object may also be continuously referred to, to continuously display the new virtual images. Different original images of the interactive object may have different facial expressions, and thus, different virtual images displayed also have different facial expressions. The facial expression of the displayed virtual image is the same as the facial expression of the original image from which the virtual image is obtained.

Figure 8:
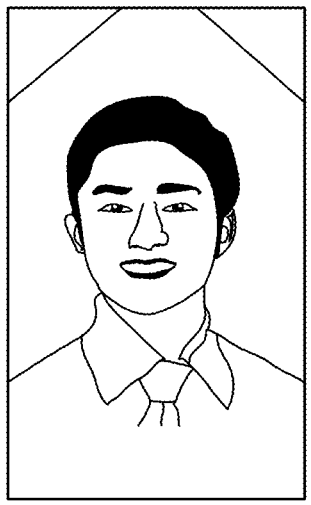
FIG. 8 is a schematic diagram of an original image of an interactive object and a virtual image retaining object ontology features of the interactive object and having target attributes provided by an embodiment of this application.
Figure 8:
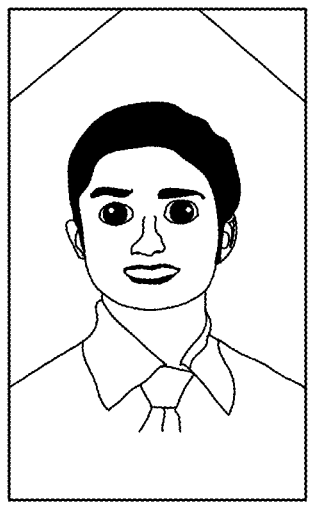
Figure 8:
Figure 8:
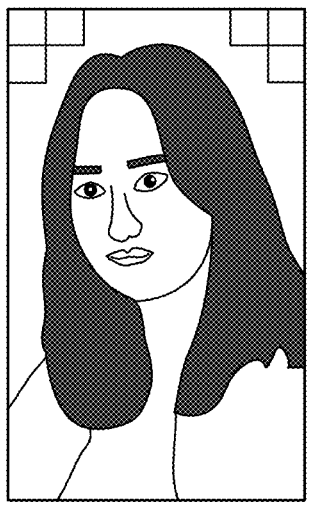
Figure 8:
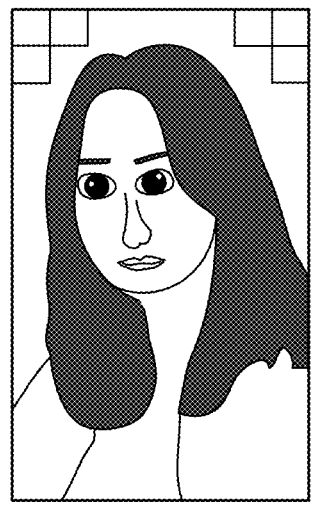
Figure 8:
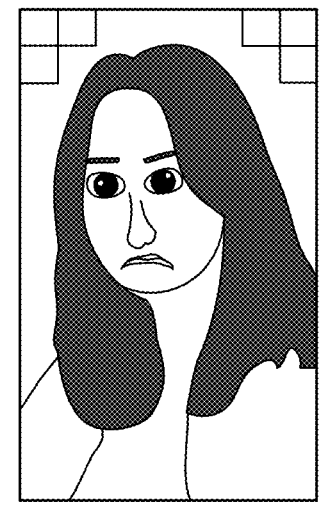

In some embodiments, the original image of the interactive object and the virtual image retaining object ontology features of the interactive object and having target attributes are shown in FIG. 8. FIG. 8 (1) is an original image obtained according to the face (interactive object) of a first user. FIG. 8 (2) is a virtual image which is obtained according to the original image shown in FIG. 8 (1) and retains face ontology features of the first user and has the target attribute of a first special effect. FIG. 8 (3) is a virtual image which is obtained according to the original image with transformed facial expressions and retains face ontology features of the first user and has the target attribute of the first special effect.

FIG. 8 (4) is an original image obtained according to the face (interactive object) of a second user. FIG. 8 (5) is a virtual image which is obtained according to the original image shown in FIG. 8 (4) and retains face ontology features of the second user and has the target attribute of a second special effect. FIG. 8 (6) is a virtual image which is obtained according to the original image with transformed facial expressions and retains face ontology features of the second user and has the target attribute of the second special effect.

In some embodiments, by means of model fusion and data enhancement, sample virtual images required for obtaining the target image generation model may be reduced to dozens of images, and stable real-time effects may be obtained by training by dozens of sample virtual images, thereby reducing the dependence of the image generation model on large-scale data, greatly broadening the applicable scope of the image generation model, and expanding the application scenes of the image generation model. The method provided in the embodiments of this application does not require large-scale data, thereby reducing the labeling cost and the research and development cost. In addition, the data enhancement method may quickly supplement images at a low cost, which greatly increases the obtaining speed of training data, accelerates the research and development cycle, and helps the gameplay of products to be implemented quickly. Based on the target image generation model, virtual images which retain excellent object ontology features and have nice target attributes may be obtained, so that good visual effects may be obtained, and the user experience is improved.

When the method provided in the embodiments of this application is applied to field of virtual human face, in the case of limited data, by means of model fusion, a real model (that is, first image generation model) and a virtual style model (that is, second image generation model) are fused to obtain a fused model with a function of generating an image retaining real textures and having a virtual style; and By means of data enhancement, the expressions and postures of virtual objects in virtual images generated by the fused model may be enriched.

In some embodiments, the target image generation model for obtaining a virtual image is obtained by fusing the first image generation model and the second image generation model, where the first image generation model may focus on the object ontology features, and the second image generation model may focus on the target attributes. As a result, the target image generation model may focus on the object ontology features and the target attributes at the same time, thereby improving the quality of the obtained virtual image. Furthermore, compared with a sample image which retains object ontology features and has target attributes, it is easier to obtain the sample original image on which the first image generation model is obtained by training and the sample virtual image on which the second image generation model is obtained by training, thereby shortening the time needed to obtain the target image generation model, to improve the efficiency of obtaining the virtual image. In other words, the method for obtaining a virtual image provided by the embodiments of this application may improve the efficiency of obtaining the virtual image while ensuring the quality of the obtained virtual image.

Figure 9:
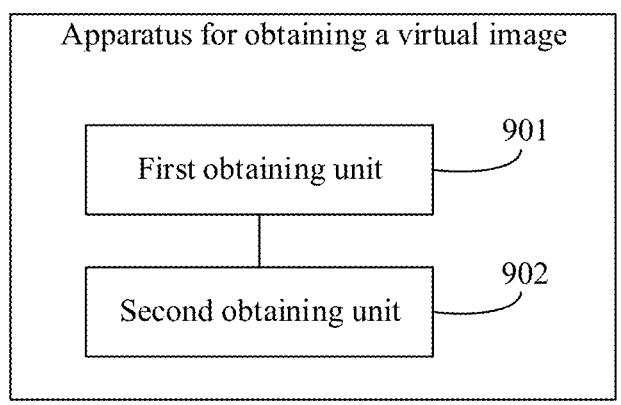
FIG. 9 is a schematic diagram of an apparatus for obtaining a virtual image provided by an embodiment of this application.

Referring to FIG. 9, an embodiment of this application provides an apparatus for obtaining a virtual image, the apparatus including:

a first obtaining unit 901 configured to obtain a target image generation model, the target image generation model being obtained by fusing a first image generation model and a second image generation model, the first image generation model being obtained by training based on a sample original image, the sample original image retaining object ontology features of a sample object, and the second image generation model being obtained by training based on a sample virtual image having target attributes; and a second obtaining unit 902 configured to obtain a target virtual image corresponding to an original image of a target object based on the target image generation model, the target virtual image retaining object ontology features of the target object and having target attributes.

Figure 10:
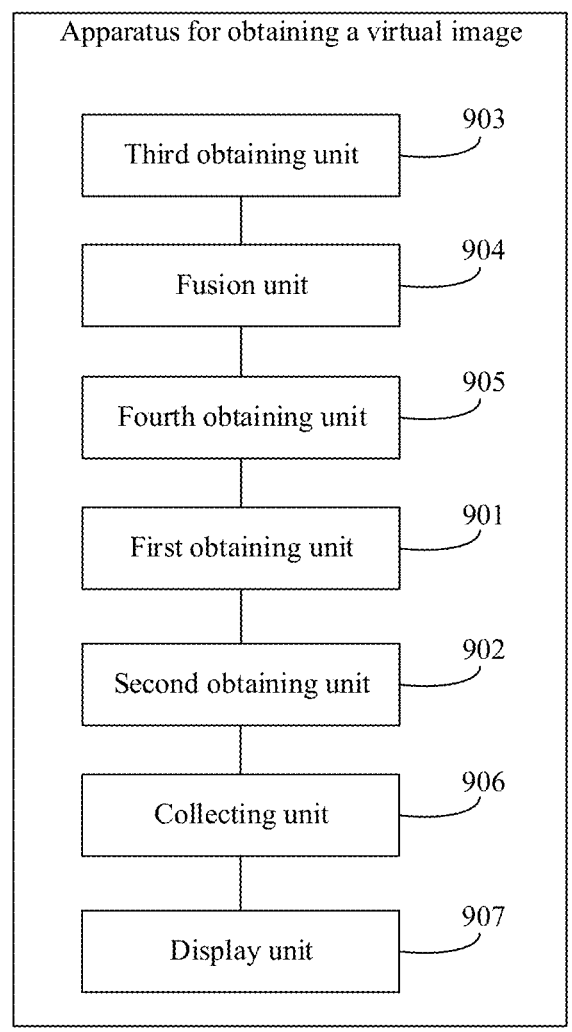
FIG. 10 is a schematic diagram of an apparatus for obtaining a virtual image provided by an embodiment of this application.

In some embodiments, referring to FIG. 10, the apparatus further includes:

a third obtaining unit 903 configured to obtain a sample original image and a sample virtual image, obtain a first image generation model by training based on the sample original image, and obtain a second image generation model by training based on the sample virtual image; and a fusion unit 904 configured to perform fusion processing on the first image generation model and the second image generation model to obtain a target image generation model.

In some embodiments, the fusion unit 904 is configured to determine at least one fusion mode, any fusion mode being configured to indicate a mode of fusing the first image generation model and the second image generation model; perform fusion processing on the first image generation model and the second image generation model according to the fusion mode for each of the fusion modes, to obtain a candidate image generation model corresponding to the fusion mode; and use the third image generation model as the target image generation model in response to an image generation function of a third image generation model meeting reference conditions, the third image generation model being a candidate image generation model meeting selection conditions in the at least one candidate image generation model.

In some embodiments, both the first image generation model and the second image generation model include a network of reference number layers, and any fusion mode includes a determination mode of target network parameters corresponding to each layer of the network in the network of reference number layers. The fusion unit 904 is further configured to obtain a determination mode corresponding to the fusion mode, the determination mode indicating a determination mode of target network parameters of each layer of the network in the network of reference number layers; determine the target network parameters corresponding to each layer of the network based on the determination mode; and adjust the parameters of the network of reference number layers in a specified image generation model based on the target network parameters corresponding to each layer of the network, and use the adjusted image generation model as any candidate image generation model, where the determination mode of the target network parameters corresponding to any layer of the network included in any fusion mode is configured to indicate the relationship between the target network parameters corresponding to any layer of the network and at least one of first network parameters and second network parameters; and the first network parameters are parameters of any layer of the network in the first image generation model, and the second network parameters are parameters of any layer of the network in the second image generation model.

In some embodiments, referring to FIG. 10, the apparatus further includes:

a fourth obtaining unit 905 configured to obtain a supplementary image in response to the image generation function of the third image generation model not meeting reference conditions, the supplementary image being configured to supplement sample virtual images.

The third obtaining unit 903 is further configured to train the second image generation model based on the supplementary image and the sample virtual image to obtain an updated second image generation model.

The fusion unit 904 is further configured to fuse the first image generation model and the updated second image generation model to obtain a fourth image generation model; and use the fourth image generation model as the target image generation model in response to the image generation function of the fourth image generation model meeting reference conditions.

In some embodiments, the fourth obtaining unit 905 is configured to obtain enhanced image features, the enhanced image features being configured to enhance the image generation function of the second image generation model; and invoke the second image generation model to perform first image generation processing on the enhanced image features to obtain the supplementary image.

In some embodiments, the fourth obtaining unit 905 is configured to obtain an image driving model, the image driving model being obtained by training based on a sample video having target attributes; invoke the image driving model to process the sample virtual image to obtain an enhanced video corresponding to the sample virtual image; and extract video frames from the enhanced video corresponding to the sample virtual image as the supplementary image.

In some embodiments, the second obtaining unit 902 is configured to obtain original image features corresponding to the original image of the target object; obtain target image features based on the original image features; and invoke the target image generation model to perform second image generation processing on the target image features to obtain the target virtual image corresponding to the original image of the target object.

In some embodiments, the second obtaining unit 902 is further configured to convert the original image features by means of an image feature conversion mode corresponding to the target image generation model, to obtain converted image features; and use the converted image features as the target image features.

In some embodiments, the second obtaining unit 902 is configured to invoke the target image generation model to perform third image generation processing on candidate image features to obtain a candidate virtual image corresponding to the candidate image features; obtain a target image translation model based on the candidate original image corresponding to the candidate image features and the candidate virtual image corresponding to the candidate image features, the candidate original image corresponding to the candidate image features being an image identified by the candidate image features and retaining object ontology features; and invoke the target image translation model to perform target image translation processing on the original image of the target object to obtain the target virtual image corresponding to the original image of the target object.

In some embodiments, the second obtaining unit 902 is further configured to invoke an initial image translation model to perform initial image translation processing on the candidate original image corresponding to the candidate image features to obtain a candidate predicted image corresponding to the candidate image features; determine a loss function based on the difference between the candidate predicted image corresponding to the candidate image features and the candidate virtual image corresponding to the candidate image features; and train the initial image translation model by means of the loss function to obtain the target image translation model.

In some embodiments, referring to FIG. 10, the apparatus further includes:

a collecting unit 906 configured to collect an original image of an interactive object in response to a virtual image display instruction for the target attributes; and a display unit 907 configured to invoke a target image prediction model to perform image prediction processing on the original image of the interactive object to obtain a virtual image corresponding to the original image of the interactive object, the target image prediction model being obtained by training based on the original image of the target object and the target virtual image corresponding to the original image of the target object; and display the virtual image corresponding to the original image of the interactive object.

In some embodiments, the target image generation model for obtaining a virtual image is obtained by fusing the first image generation model and the second image generation model, where the first image generation model may focus on the object ontology features, and the second image generation model may focus on the target attributes. As a result, the target image generation model may focus on the object ontology features and the target attributes at the same time, thereby improving the quality of the obtained virtual image. Furthermore, compared with a sample image which retains object ontology features and has target attributes, it is easier to obtain the sample original image on which the first image generation model is obtained by training and the sample virtual image on which the second image generation model is obtained by training, thereby shortening the obtaining time of the target image generation model, to improve the efficiency of obtaining the virtual image. In other words, the method for obtaining a virtual image provided by the embodiments of this application may improve the efficiency of obtaining the virtual image while ensuring the quality of the obtained virtual image.

It is to be noted that when the apparatus provided in the foregoing embodiments implements functions of the apparatus, only division of the foregoing function modules is used as an example for description. In the practical application, the functions may be assigned to and completed by different functional modules according to the requirements. That is, an internal structure of the device is divided into different functional modules, to implement all or some of the functions described above In addition, the apparatus and method embodiments provided in the foregoing embodiments belong to one conception. For the specific implementation process, reference may be made to the method embodiments, and details are not described herein again.

In some embodiments, a computer device is further provided, including a processor and a memory, the memory storing at least one computer program. The at least one computer program is loaded and executed by one or more processors, so that the computer device implements any one of the above-mentioned methods for obtaining a virtual image. In some embodiments, the computer device may be a server or a terminal. The structures of the server and the terminal are introduced separately below.

Figure 11:
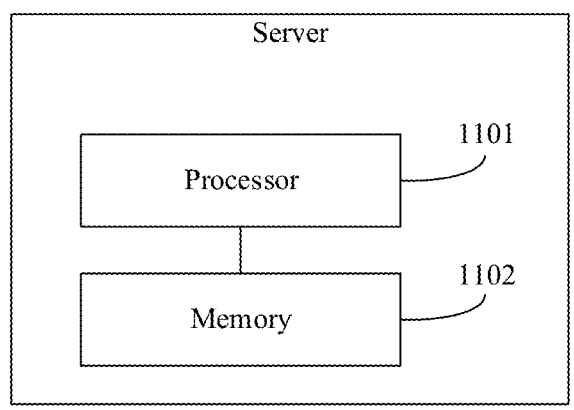
FIG. 11 is a schematic structural diagram of a server provided by an embodiment of this application.

FIG. 11 is a schematic structural diagram of a server according to an embodiment of this application. The server may vary greatly because a configuration or performance varies, and may include one or more central processing units (CPU) 1101 and one or more memories 1102. The one or more memories 1102 store at least one computer program, and the at least one computer program is loaded and executed by the one or more processors 1101 to enable the server to implement the method for obtaining a virtual image provided in the foregoing various method embodiments Certainly, the server may further include components such as a wired or wireless network interface, a keyboard, and an input/output interface, to facilitate inputs/outputs. The server may further include another component configured to implement a function of a device, and details are not described herein again.

Figure 12:
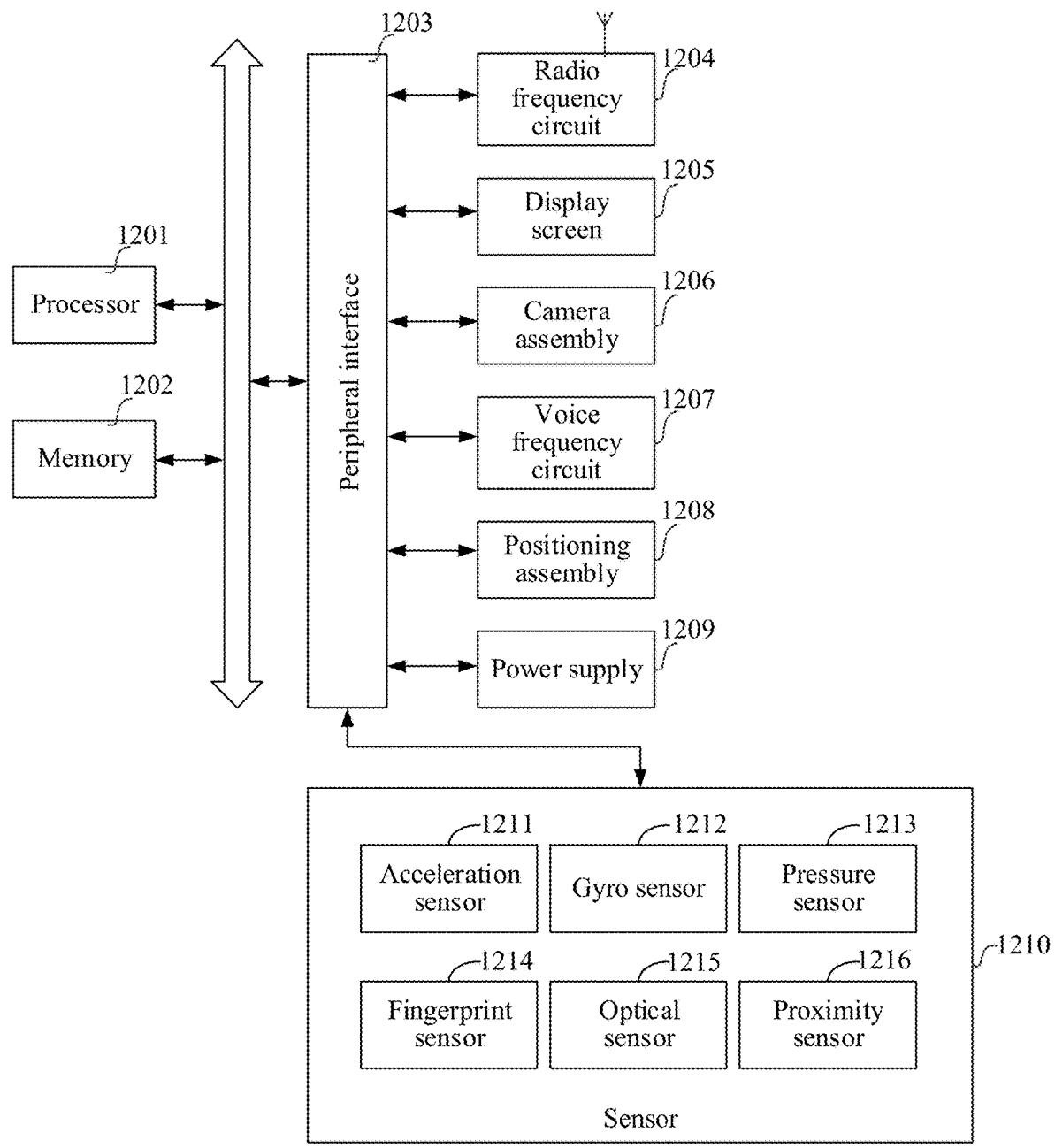
FIG. 12 is a schematic structural diagram of a terminal provided by an embodiment of this application.

FIG. 12 is a schematic structural diagram of a terminal provided by an embodiment of this application. The terminal may be: a smartphone, a tablet computer, a notebook computer, or a desktop computer. The terminal may also be referred to as user equipment, a portable terminal, a laptop terminal, a desktop terminal, or other names.

Generally, the terminal includes: a processor 1201 and a memory 1202.

In some embodiments, the terminal may further optionally include: a peripheral interface 1203 and at least one peripheral device. The processor 1201, the memory 1202, and the peripheral interface 1203 may be connected through a bus or a signal cable. Each peripheral device may be connected to the peripheral interface 1203 through a bus, a signal cable, or a circuit board. Specifically, the peripheral device includes: at least one of a radio frequency (RF) circuit 1204, a display screen 1205, a camera assembly 1206, an audio circuit 1207, a positioning assembly 1208, and a power supply 1209.

In some embodiments, the terminal further includes one or more sensors 1210. The one or more sensors 1210 include but are not limited to: an acceleration sensor 1211, a gyro sensor 1212, a pressure sensor 1213, a fingerprint sensor 1214, an optical sensor 1215, and a proximity sensor 1216.

A person skilled in the art may understand that the structure shown in FIG. 12 constitutes no limitation on the terminal, and the terminal may include more or fewer components than those shown in the figure, or some components may be combined, or a different component deployment may be used.

In some embodiments, the computer program involved in the embodiment of this application may be executed on a computer device, or executed on a plurality of computer devices at the same location, or executed on a plurality of computer devices that are distributed in a plurality of locations and interconnected by using a communication network. The plurality of computer devices distributed in the plurality of locations and interconnected by using a communication network may form a blockchain system. That is, the foregoing server and terminal may serve as a node device in a blockchain system.

In some embodiments, a computer-readable storage medium is further provided, storing at least one computer program, the at least one computer program being loaded and executed by a processor of a computer device to enable a computer to implement any one of the above-mentioned methods for obtaining a virtual image.

In some embodiments, the computer-readable storage medium may be a read-only memory (ROM), a random access memory (RAM), a compact disc read-only memory (CD-ROM), a magnetic tape, a floppy disk, an optical data storage device, and the like.

In some embodiments, a computer program product or a computer program is further provided, including computer instructions, the computer instructions being stored in a computer-readable storage medium. A processor of a computer device reads the computer instructions from the computer-readable storage medium and executes the computer instructions, enabling the computer device to perform any one of the above-mentioned methods for obtaining a virtual image.

It should be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The foregoing descriptions are merely exemplary embodiments of this application, but are not intended to limit this application. Any modification, equivalent replacement, and improvement made without departing from the spirit and principle of this application shall fall within the protection scope of this application.

What is claimed is:

1. A method for obtaining a virtual image, performed by an electronic device, the method comprising:
   obtaining a target image generation model by:
   obtaining a sample original image and a sample virtual image, the sample original image retaining object ontology features of a sample object;
   obtaining a first image generation model by training based on the sample original image;
   obtaining a second image generation model by training based on the sample virtual image having target attributes;
   determining a fusion mode, the fusion mode indicating a mode of fusing the first image generation model and the second image generation model;
   fusing the first image generation model and the second image generation model according to the fusion mode, to obtain a candidate image generation model corresponding to the fusion mode; and
   using a third image generation model as the target image generation model in response to an image generation function of the third image generation model meeting reference conditions, the third image generation model being a candidate image generation model meeting selection conditions; and
   obtaining a target virtual image corresponding to an original image of a target object based on the target image generation model, the target virtual image retaining object ontology features of the target object and having the target attributes.

2. The method according to claim 1, wherein both the first image generation model and the second image generation model comprise a network of reference number layers, and fusion mode comprises a determination mode of target network parameters corresponding to each layer of the network in the network of reference number layers; the fusing the first image generation model and the second image generation model according to the fusion mode, to obtain a candidate image generation model corresponding to the fusion mode comprises:
   obtaining a determination mode corresponding to the fusion mode, the determination mode indicating a determination mode of target network parameters of each layer of the network of the network of reference number layers;
   determining the target network parameters corresponding to each layer of the network based on the determination mode; and
   adjusting the parameters of the network of reference number layers in a specified image generation model based on the target network parameters corresponding to each layer of the network, and using the adjusted image generation model as a candidate image generation model, wherein the determination mode of the target network parameters corresponding to a layer of the network comprised in a fusion mode indicating the relationship between the target network parameters corresponding to a layer of the network and at least one of first network parameters and second network parameters; and the first network parameters are parameters of a layer of the network in the first image generation model, and the second network parameters are parameters of a layer of the network in the second image generation model.

3. The method according to claim 1, wherein the method further comprises:

obtaining a supplementary image in response to the image generation function of the third image generation model not meeting the reference conditions, the supplementary image supplementing sample virtual images;

training the second image generation model based on the supplementary image and the sample virtual image to obtain an updated second image generation model;

fusing the first image generation model and the updated second image generation model to obtain a fourth image generation model; and using the fourth image generation model as the target image generation model in response to the image generation function of the fourth image generation model meeting the reference conditions.

4. The method according to claim 3, wherein the obtaining a supplementary image comprises:

obtaining enhanced image features, the enhanced image features enhancing the image generation function of the second image generation model; and invoking the second image generation model to perform first image generation processing on the enhanced image features to obtain the supplementary image.

5. The method according to claim 3, wherein the obtaining a supplementary image comprises:

obtaining an image driving model by training based on a sample video having the target attributes;

invoking the image driving model to obtain an enhanced video corresponding to the sample virtual image; and extracting video frames from the enhanced video corresponding to the sample virtual image as the supplementary image.

6. The method according to claim 1, wherein the obtaining a target virtual image corresponding to an original image of a target object based on the target image generation model comprises:

obtaining original image features corresponding to the original image of the target object;

obtaining target image features based on the original image features; and invoking the target image generation model to perform second image generation processing on the target image features to obtain the target virtual image corresponding to the original image of the target object.

7. The method according to claim 6, wherein the obtaining target image features based on the original image features comprises:

converting the original image features by an image feature conversion mode corresponding to the target image generation model, to obtain converted image features; and using the converted image features as the target image features.

8. The method according to claim 1, wherein the obtaining a target virtual image corresponding to an original image of a target object based on the target image generation model comprises:

invoking the target image generation model to perform third image generation processing on candidate image features to obtain a candidate virtual image;

obtaining a target image translation model based on the candidate original image corresponding to the candidate image features and the candidate virtual image corresponding to the candidate image features, the candidate original image being an image identified by the candidate image features and retaining object ontology features; and invoking the target image translation model to perform target image translation processing on the original image of the target object to obtain the target virtual image.

9. The method according to claim 8, wherein the obtaining a target image translation model based on the candidate original image corresponding to the candidate image features and the candidate virtual image corresponding to the candidate image features comprises:

invoking an initial image translation model to perform initial image translation processing on the candidate original image corresponding to the candidate image features to obtain a candidate predicted image corresponding to the candidate image features;

determining a loss function based on the difference between the candidate predicted image corresponding to the candidate image features and the candidate virtual image corresponding to the candidate image features; and training the initial image translation model using the loss function to obtain the target image translation model.

10. The method according to claim 1, wherein after the obtaining a target virtual image corresponding to an original image of a target object based on the target image generation model, the method further comprises:

collecting an original image of an interactive object in response to a virtual image display instruction for the target attributes;

invoking a target image prediction model to perform image prediction processing on the original image of the interactive object to obtain a virtual image corresponding to the original image of the interactive object, the target image prediction model being trained based on the original image of the target object and the target virtual image corresponding to the original image of the target object; and displaying the virtual image corresponding to the original image of the interactive object.

11. A computer device, comprising a processor and a memory, the memory storing at least one computer program, the at least one computer program being loaded and executed by the processor to enable the computer device to implement:

obtaining a target image generation model by:
obtaining a sample original image and a sample virtual image, the sample original image retaining object ontology features of a sample object;
obtaining a first image generation model by training based on the sample original image;

obtaining a second image generation model by training based on the sample virtual image having target attributes;

determining a fusion mode, the fusion mode indicating a mode of fusing the first image generation model and the second image generation model;

fusing the first image generation model and the second image generation model according to the fusion mode, to obtain a candidate image generation model corresponding to the fusion mode; and using a third image generation model as the target image generation model in response to an image generation function of the third image generation model meeting reference conditions, the third image generation model being a candidate image generation model meeting selection conditions; and obtaining a target virtual image corresponding to an original image of a target object based on the target image generation model, the target virtual image retaining object ontology features of the target object and having the target attributes.

12. The computer device according to claim 11, wherein both the first image generation model and the second image generation model comprise a network of reference number layers, and fusion mode comprises a determination mode of target network parameters corresponding to each layer of the network in the network of reference number layers; the fusing the first image generation model and the second image generation model according to the fusion mode, to obtain a candidate image generation model corresponding to the fusion mode comprises:

obtaining a determination mode corresponding to the fusion mode, the determination mode indicating a determination mode of target network parameters of each layer of the network of the network of reference number layers;

determining the target network parameters corresponding to each layer of the network based on the determination mode; and adjusting the parameters of the network of reference number layers in a specified image generation model based on the target network parameters corresponding to each layer of the network, and using the adjusted image generation model as a candidate image generation model, wherein the determination mode of the target network parameters corresponding to a layer of the network comprised in a fusion mode indicating the relationship between the target network parameters corresponding to a layer of the network and at least one of first network parameters and second network parameters; and the first network parameters are parameters of a layer of the network in the first image generation model, and the second network parameters are parameters of a layer of the network in the second image generation model.

13. The computer device according to claim 11, wherein obtaining the target image generation model further comprises:

obtaining a supplementary image in response to the image generation function of the third image generation model not meeting the reference conditions, the supplementary image supplementing sample virtual images;

training the second image generation model based on the supplementary image and the sample virtual image to obtain an updated second image generation model;

fusing the first image generation model and the updated second image generation model to obtain a fourth image generation model; and using the fourth image generation model as the target image generation model in response to the image generation function of the fourth image generation model meeting the reference conditions.

14. The computer device according to claim 13, wherein the obtaining a supplementary image comprises:

obtaining enhanced image features, the enhanced image features enhancing the image generation function of the second image generation model; and invoking the second image generation model to perform first image generation processing on the enhanced image features to obtain the supplementary image.

15. The computer device according to claim 13, wherein the obtaining a supplementary image comprises:

obtaining an image driving model by training based on a sample video having the target attributes;

invoking the image driving model to obtain an enhanced video corresponding to the sample virtual image; and extracting video frames from the enhanced video corresponding to the sample virtual image as the supplementary image.

16. A non-transitory computer-readable storage medium, storing at least one computer program, the at least one computer program being loaded and executed by a processor to enable a computer to implement:

obtaining a target image generation model by:

obtaining a sample original image and a sample virtual image, the sample original image retaining object ontology features of a sample object;

obtaining a first image generation model by training based on the sample original image;

obtaining a second image generation model by training based on the sample virtual image having target attributes;

determining a fusion mode, the fusion mode indicating a mode of fusing the first image generation model and the second image generation model;

fusing the first image generation model and the second image generation model according to the fusion mode, to obtain a candidate image generation model corresponding to the fusion mode; and using a third image generation model as the target image generation model in response to an image generation function of the third image generation model meeting reference conditions, the third image generation model being a candidate image generation model meeting selection conditions; and obtaining a target virtual image corresponding to an original image of a target object based on the target image generation model, the target virtual image retaining object ontology features of the target object and having the target attributes.

* * * * *